United States Patent
Greenwood et al.

(10) Patent No.: US 11,023,157 B2
(45) Date of Patent: Jun. 1, 2021

(54) INTERMEDIARY DUPLICATION TO FACILITATE COPY REQUESTS IN DISTRIBUTED STORAGE SYSTEMS

(71) Applicant: Amazon Technologies, Inc., Seattle, WA (US)

(72) Inventors: Christopher Magee Greenwood, Seattle, WA (US); Danny Wei, Seattle, WA (US); Kiran-Kumar Muniswamy-Reddy, Sammamish, WA (US); Wells Lin, Seattle, WA (US); Igor A. Kostic, Kirkland, WA (US); Colin Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 402 days.

(21) Appl. No.: 15/967,284

(22) Filed: Apr. 30, 2018

(65) Prior Publication Data

US 2019/0332269 A1    Oct. 31, 2019

(51) Int. Cl.
*G06F 16/00* (2019.01)
*G06F 3/06* (2006.01)

(52) U.S. Cl.
CPC .............. *G06F 3/065* (2013.01); *G06F 3/061* (2013.01); *G06F 3/067* (2013.01); *G06F 3/0644* (2013.01); *G06F 3/0652* (2013.01)

(58) Field of Classification Search
CPC .... G06F 3/067; G06F 2201/88; G06F 3/0619; G06F 11/1076; G06F 3/064;
(Continued)

(56) References Cited

U.S. PATENT DOCUMENTS

| 5,434,994 | A  | 7/1995  | Shaheen et al. |
| 5,574,878 | A  | 11/1996 | Onodera et al. |
| 6,463,509 | B1 | 10/2002 | Teoman et al. |
| 7,502,960 | B1 | 3/2009  | Todd et al. |
| 7,788,664 | B1 | 8/2010  | Janakiraman et al. |
| 7,895,261 | B2 | 2/2011  | Jones et al. |

(Continued)

FOREIGN PATENT DOCUMENTS

| WO | WO 2011/088261 A3 | 7/2011 |
| WO | WO 2017/028885 A1 | 2/2017 |
| WO | WO 2019/212768 A1 | 7/2019 |

OTHER PUBLICATIONS

Search Report and Written Opinion issued in PCT/US2019/028320, dated Jul. 8, 2019.

(Continued)

*Primary Examiner* — Yicun Wu
(74) *Attorney, Agent, or Firm* — Knobbe, Martens, Olson & Bear, LLP

(57) ABSTRACT

Generally described, aspects of the present application correspond to enabling rapid duplication of data within a data volume hosted on a network storage system. The network storage system can maintain a highly distributed replica of the data volume, designated for duplication of data within the volume and separate from one or more other replicas designated for handling modifications to the data volume. By providing increased parallelization, the highly distributed replica can facilitate rapid duplication of the volume. When a sufficiently large request to duplicate the data volume is received, the system can create additional duplicate portions of the volume to further increase parallelization. For example, a partition of the highly distributed replica may be repeatedly duplicated to create a large number of intermediary duplicate partitions. The intermediary duplicate partitions can then be used to service the duplication request rapidly, due to increased parallelism.

17 Claims, 23 Drawing Sheets

(58) Field of Classification Search
CPC ......... G06F 2211/1028; G06F 11/1092; G06F 11/3006; G06F 3/0644; G06F 9/451; G06F 16/2237; G06F 3/0604; G06F 3/061; G06F 3/0647; G06F 3/0659; G06F 9/45558; G06F 2009/45595; G06F 3/0635; G06F 11/3051; G06F 16/182; G06F 2009/4557; G06F 21/64; G06F 3/0611; G06F 11/108; G06F 11/2064; G06F 11/3034; G06F 16/86; G06F 16/951; G06F 17/30153; G06F 2009/45579; G06F 3/0482; G06F 3/0653; G06F 3/0685; G06F 3/0689; G06F 9/5027; G06F 9/5077; G06F 11/0712; G06F 11/10; G06F 11/2056; G06F 11/2074; G06F 11/3442; G06F 11/3452; G06F 11/3476; G06F 11/349; G06F 16/2379; G06F 16/24573; G06F 16/24578; G06F 16/278; G06F 21/602; G06F 21/62; G06F 21/6218; G06F 2201/855; G06F 2209/501; G06F 2212/1052; G06F 3/06; G06F 3/0607; G06F 3/0614; G06F 3/0616; G06F 3/0622; G06F 3/0623; G06F 3/0637; G06F 3/0671; G06F 9/505; G06F 9/5083; G06F 11/008; G06F 11/0727; G06F 11/1088; G06F 11/1435; G06F 11/1448; G06F 11/1458; G06F 11/1464; G06F 11/1469; G06F 11/2025; G06F 11/203; G06F 11/2041; G06F 11/2048; G06F 11/2058; G06F 11/3409; G06F 11/3485; G06F 12/1458; G06F 16/00; G06F 16/10; G06F 16/122; G06F 16/1865; G06F 16/1873; G06F 16/22; G06F 16/2365; G06F 16/24553; G06F 16/258; G06F 16/27; G06F 2003/0695; G06F 2003/0698; G06F 21/31; G06F 21/53; G06F 21/56; G06F 21/568; G06F 21/606; G06F 21/6272; G06F 21/74; G06F 21/78; G06F 2201/81; G06F 2201/815; G06F 2212/154; G06F 2212/254; G06F 2221/2101; G06F 2221/2141
See application file for complete search history.

(56) References Cited

U.S. PATENT DOCUMENTS

| | | | |
|---|---|---|---|
| 7,975,102 | B1 | 7/2011 | Hyer et al. |
| 8,280,853 | B1 | 10/2012 | Lai et al. |
| 8,285,687 | B2 | 10/2012 | Voll et al. |
| 8,589,574 | B1 | 11/2013 | Cormie et al. |
| 8,688,660 | B1 | 4/2014 | Sivasubramanian et al. |
| 8,725,968 | B2 | 5/2014 | Wada |
| 8,849,758 | B1 | 9/2014 | Sivasubramanian et al. |
| 9,003,227 | B1 | 4/2015 | Patel et al. |
| 9,110,600 | B1 | 8/2015 | Brooker et al. |
| 9,246,996 | B1 | 1/2016 | Brooker et al. |
| 9,503,517 | B1 | 11/2016 | Brooker et al. |
| 9,563,385 | B1 | 2/2017 | Kowalski et al. |
| 9,665,307 | B1 | 5/2017 | LeCrone et al. |
| 9,720,620 | B1 | 8/2017 | Wei et al. |
| 9,823,840 | B1 | 11/2017 | Brooker et al. |
| 9,826,030 | B1 | 11/2017 | Dhoolam et al. |
| 9,946,604 | B1 | 4/2018 | Glass |
| 10,055,352 | B2 | 8/2018 | Wei et al. |
| 10,452,296 | B1 | 10/2019 | Greenwood et al. |
| 10,459,655 | B1 | 10/2019 | Greenwood et al. |
| 10,505,862 | B1 | 12/2019 | Dhoolam et al. |
| 10,768,850 | B2 | 9/2020 | Muniswamy-Reddy et al. |
| 2002/0059253 | A1 | 5/2002 | Albazz et al. |
| 2002/0144070 | A1 | 10/2002 | Watanabe et al. |
| 2003/0028737 | A1 | 2/2003 | Kaiya et al. |
| 2003/0050974 | A1 | 3/2003 | Mani-Meitav et al. |
| 2003/0191930 | A1 | 10/2003 | Viljoen et al. |
| 2003/0204597 | A1 | 10/2003 | Arakawa et al. |
| 2004/0078419 | A1 | 4/2004 | Ferrari et al. |
| 2005/0193113 | A1 | 9/2005 | Kokusho et al. |
| 2006/0271530 | A1 | 11/2006 | Bauer |
| 2008/0086616 | A1 | 4/2008 | Asano et al. |
| 2008/0126699 | A1 | 5/2008 | Sangapu et al. |
| 2008/0140883 | A1 | 6/2008 | Salessi et al. |
| 2008/0140905 | A1 | 6/2008 | Okuyama et al. |
| 2009/0077140 | A1 | 3/2009 | Anglin et al. |
| 2009/0222632 | A1 | 9/2009 | Sasage et al. |
| 2009/0228889 | A1 | 9/2009 | Yoshida |
| 2009/0249470 | A1 | 10/2009 | Litvin et al. |
| 2010/0037009 | A1 | 2/2010 | Yano et al. |
| 2010/0070725 | A1 | 3/2010 | Prahlad et al. |
| 2010/0191922 | A1 | 7/2010 | Dickey et al. |
| 2010/0312983 | A1 | 12/2010 | Moon et al. |
| 2011/0191554 | A1 | 8/2011 | Sakai et al. |
| 2012/0030318 | A1 | 2/2012 | Ryder |
| 2012/0030343 | A1 | 2/2012 | Ryder |
| 2012/0079221 | A1 | 3/2012 | Sivasubramanian et al. |
| 2012/0079505 | A1 | 3/2012 | Tarta et al. |
| 2012/0215835 | A1 | 8/2012 | Takano et al. |
| 2012/0246511 | A1 | 9/2012 | Sato |
| 2012/0254687 | A1 | 10/2012 | Leggette et al. |
| 2012/0303576 | A1 | 11/2012 | Calder et al. |
| 2013/0007753 | A1 | 1/2013 | Jain |
| 2013/0036091 | A1 | 2/2013 | Provenzano et al. |
| 2013/0046966 | A1 | 2/2013 | Chu et al. |
| 2013/0054890 | A1 | 2/2013 | Desai et al. |
| 2013/0055248 | A1 | 2/2013 | Sokolinski et al. |
| 2013/0086585 | A1 | 4/2013 | Huang et al. |
| 2013/0104126 | A1 | 4/2013 | Padmanabhuni et al. |
| 2013/0198459 | A1 | 8/2013 | Joshi et al. |
| 2013/0268575 | A1 | 10/2013 | Xu |
| 2013/0304903 | A1 | 11/2013 | Mick et al. |
| 2014/0136482 | A1 | 5/2014 | Rochette |
| 2014/0181046 | A1 | 6/2014 | Pawar et al. |
| 2014/0280441 | A1 | 9/2014 | Jacobson et al. |
| 2014/0351636 | A1* | 11/2014 | Yin ............... G06F 11/1662 714/15 |
| 2014/0359130 | A1* | 12/2014 | Southern ............ G06F 9/4856 709/226 |
| 2015/0128053 | A1 | 5/2015 | Bragstad et al. |
| 2015/0134615 | A1 | 5/2015 | Goodman et al. |
| 2015/0134723 | A1 | 5/2015 | Kansal et al. |
| 2015/0139168 | A1 | 5/2015 | Zhi et al. |
| 2015/0160885 | A1 | 6/2015 | Hara et al. |
| 2015/0286432 | A1 | 10/2015 | Dain et al. |
| 2015/0370483 | A1 | 12/2015 | Schoebel-Theuer |
| 2016/0026395 | A1 | 1/2016 | Lee |
| 2016/0036938 | A1 | 2/2016 | Aviles et al. |
| 2016/0085651 | A1 | 3/2016 | Factor et al. |
| 2016/0224244 | A1 | 8/2016 | Gensler et al. |
| 2016/0291889 | A1* | 10/2016 | Dawson ............... G06F 3/065 |
| 2017/0024764 | A1 | 1/2017 | Mooser et al. |
| 2017/0147243 | A1 | 5/2017 | Kowalski et al. |
| 2017/0192857 | A1 | 7/2017 | Meiri et al. |
| 2017/0222935 | A1 | 8/2017 | Kalman et al. |
| 2017/0237809 | A1 | 8/2017 | Farinacci et al. |
| 2017/0329528 | A1 | 11/2017 | Wei et al. |
| 2018/0173874 | A1 | 6/2018 | Muttik et al. |
| 2018/0329935 | A1 | 11/2018 | Mugali |
| 2018/0359336 | A1 | 12/2018 | Chattopadhyay et al. |
| 2019/0042636 | A1 | 2/2019 | Sipka et al. |
| 2019/0347352 | A1 | 11/2019 | Gochkov et al. |
| 2020/0142596 | A1 | 5/2020 | Greenwood et al. |

OTHER PUBLICATIONS

"Amazon EBS API and Command Overview", downloaded Jul. 11, 2013 from dov.aws.amazon.com/AWSEC2/latest/UserGuide/ebs-api-cli-overview.html, p. 1.

(56) References Cited

OTHER PUBLICATIONS

"AMI Basics" downloaded Jul. 11, 2013 from doc.aws.amazon.com/AWSEC2/latest/UserGuide/ComponentsAMIs.html, p. 1-2.
"AWS Amazon Elastic Block Store (EBS)—Persistent Storage" downloaded Jul. 11, 2013 from aws.amazon.com/ebs/ pp. 1-4.
Amazon S3 Storage Services Guide—Developer Guide (API Version Mar. 1, 2006). Can be accessed at http://docs.aws.amazon.com/AmazonS3/latest/dev/Welcome.html.
"Cloudiquity" Published Mar. 12, 2009, Amazon Web Services and Cloud, pp. 1-4.
"Feature Guide: Elastic Block Store: Articles & Tutorials: Amazon Web Services" downloaded Jul. 11, 2013 from aws.amazon.com/articlse/1667, pp. 1-7.
HP; Chris Hyser et al.; Autonomic Virtual Machine Placement in the Data Center; pp. 1-10, Feb. 26, 2008; HP Laboratories.
International Preliminary Report on Patentability issued in PCT/US2019/028320, dated Nov. 3, 2020.
NLP IP (https://iq.ip.com/discover search results) (Year: 2020).
Reich et al. VMTorrent: Scalable P2p Virtual Machine Streaming Dec. 10-13, 2012.
SwinBrain. "Database Management System Introduction". Nov. 17, 2009. Also available at http://swinbrain.icl.swin.edu.au/wiki/Database_Management_Systems_Introduction.
VMware; Carl Waldspurger; Memory Resource Management in VMware ESX Server; pp. 1-24, Dec. 10, 2002.
Xia et al., Taming IO Spikes in Enterprise and Campus VM Deployment Jun. 2014.

* cited by examiner

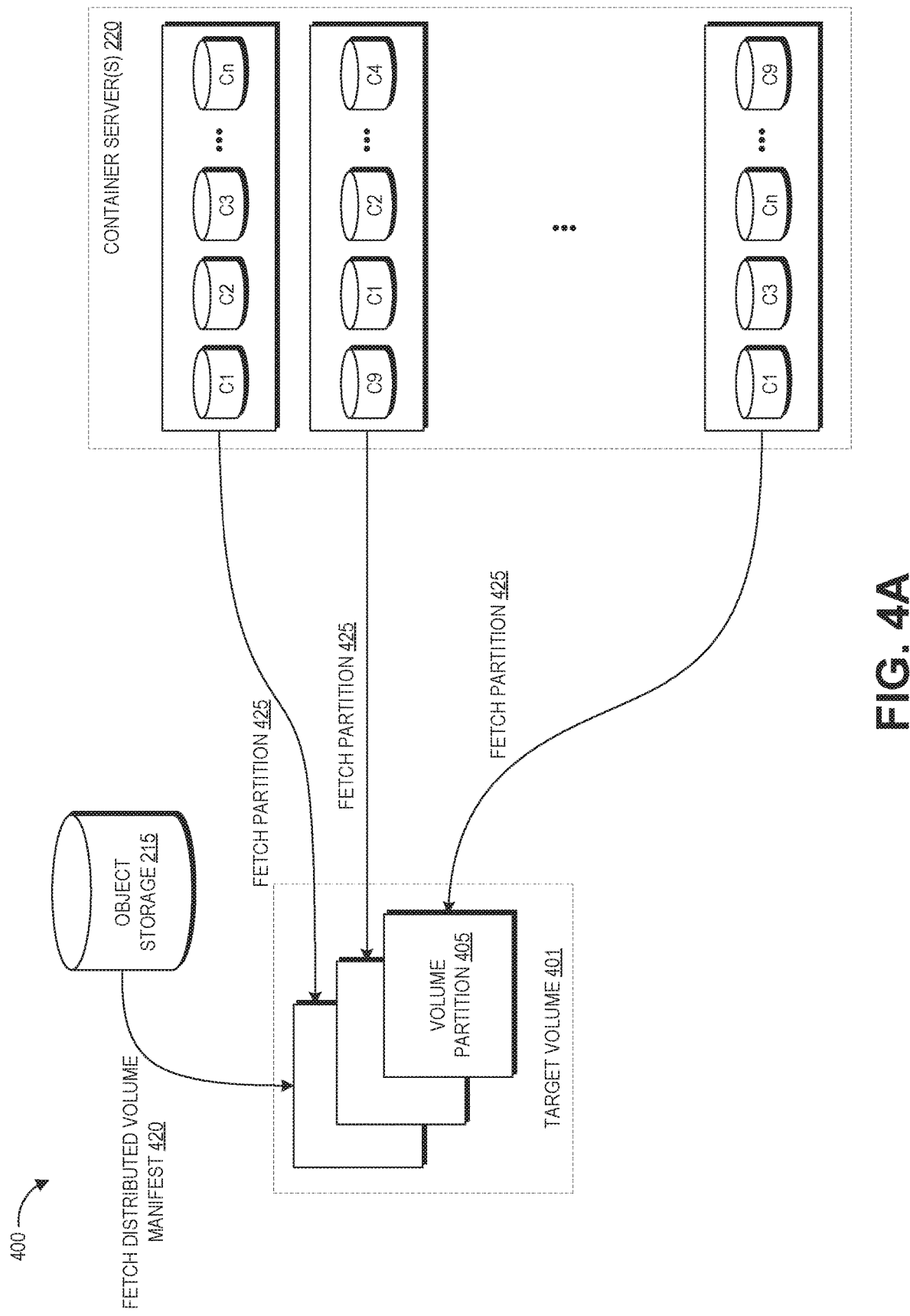

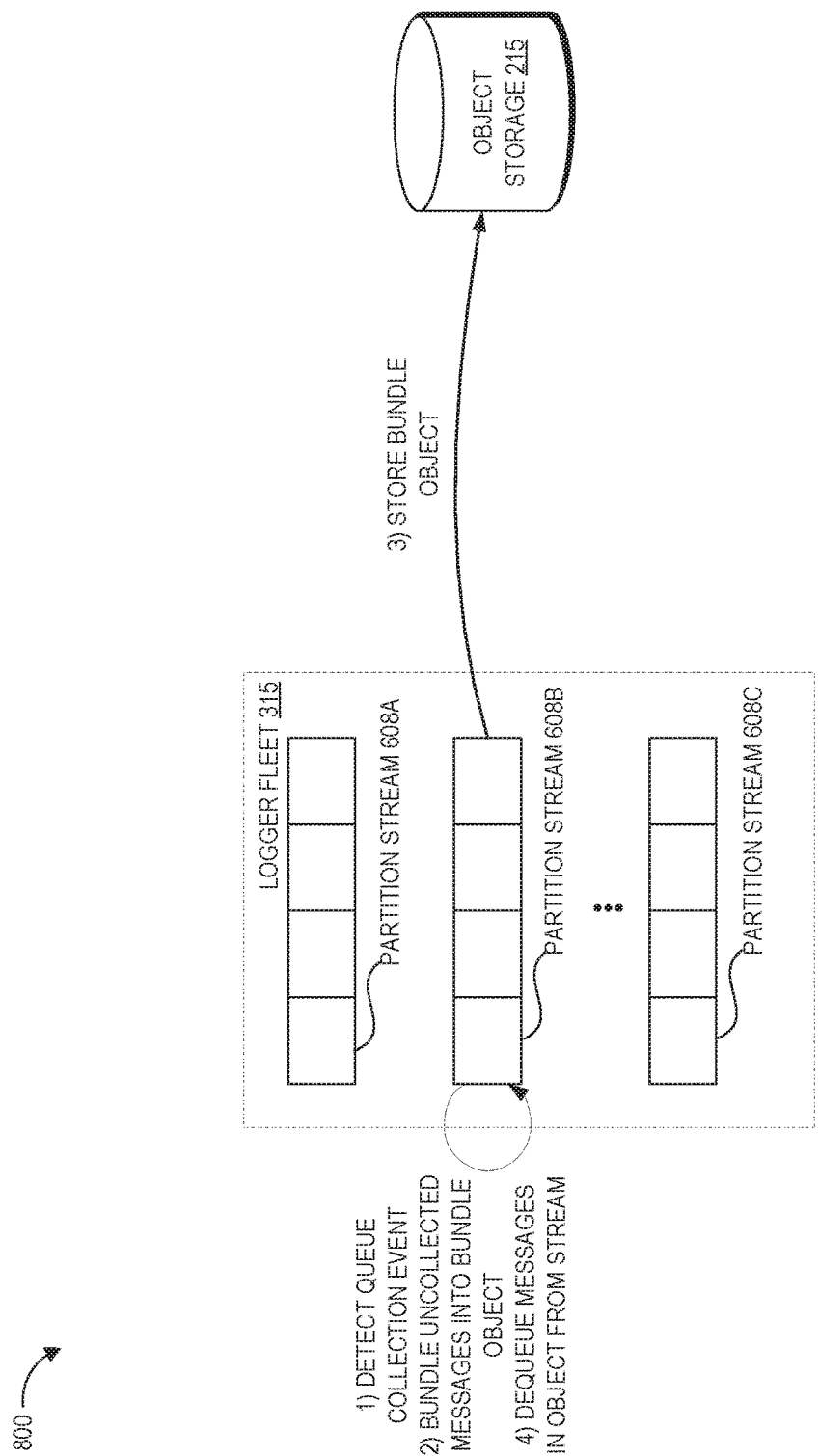

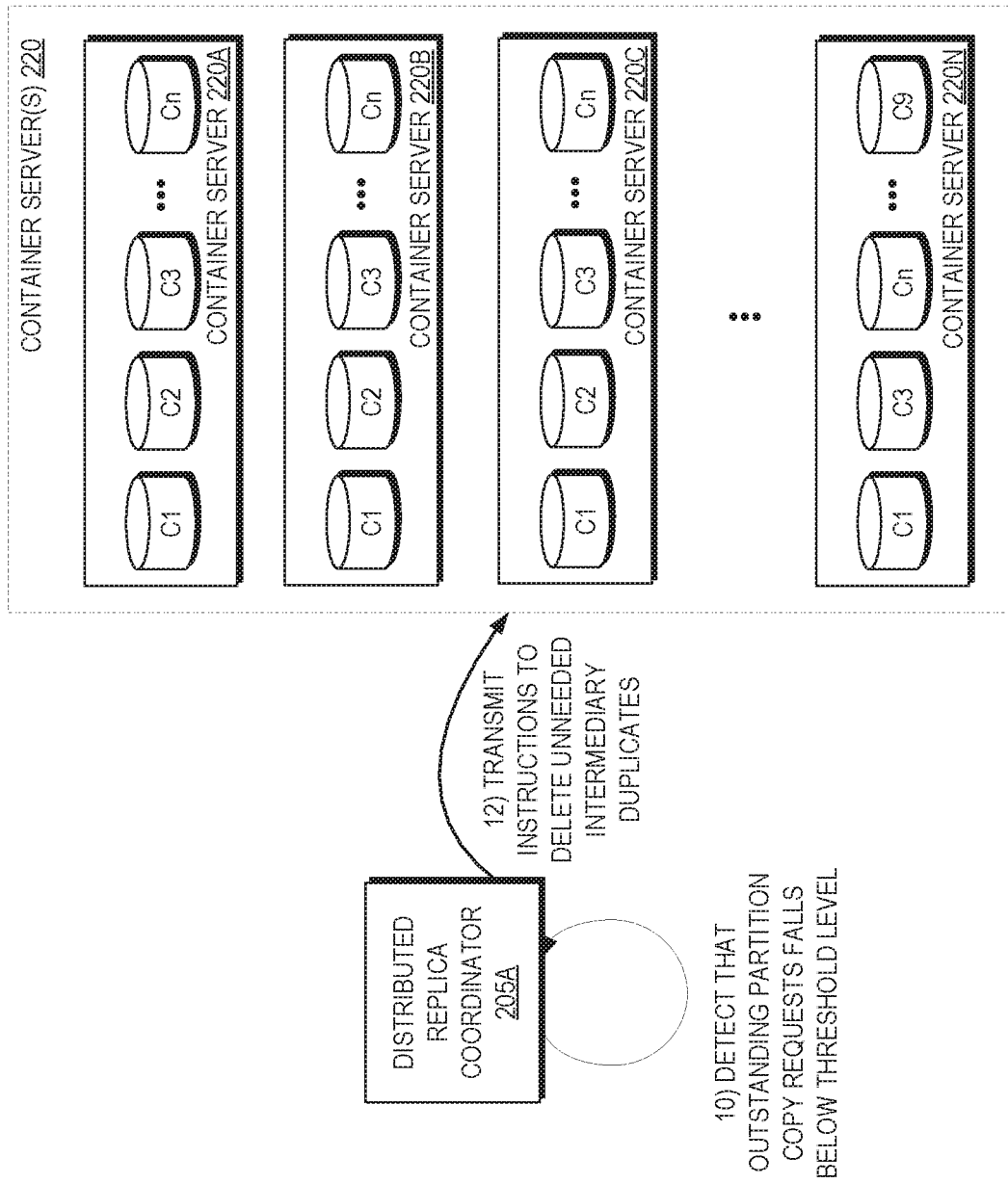

US 11,023,157 B2

INTERMEDIARY DUPLICATION TO FACILITATE COPY REQUESTS IN DISTRIBUTED STORAGE SYSTEMS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively infrastructure of on-premises computing environments, requires a system architecture that can reliably re-allocate its hardware according to the changing needs of its user base.

BRIEF DESCRIPTION OF THE DRAWINGS

FIG. 4A depicts a schematic diagram of generating a clone of a volume from a distributed tertiary replica within the elastic computing system of FIG. 1A.

FIG. 8 depicts illustrative interactions for generating a bundle of messages reflecting write operations to a distributed storage volume to asynchronously update a distributed tertiary replica of the elastic computing system of FIG. 1A and for storing such a bundle on an object storage system.

FIGS. 10A-10C depict illustrative interactions for facilitating mass duplication of a volume or portion of a volume by use of a centralized authority to create intermediary duplicate partitions for the volume.

DETAILED DESCRIPTION

Figure 1A:
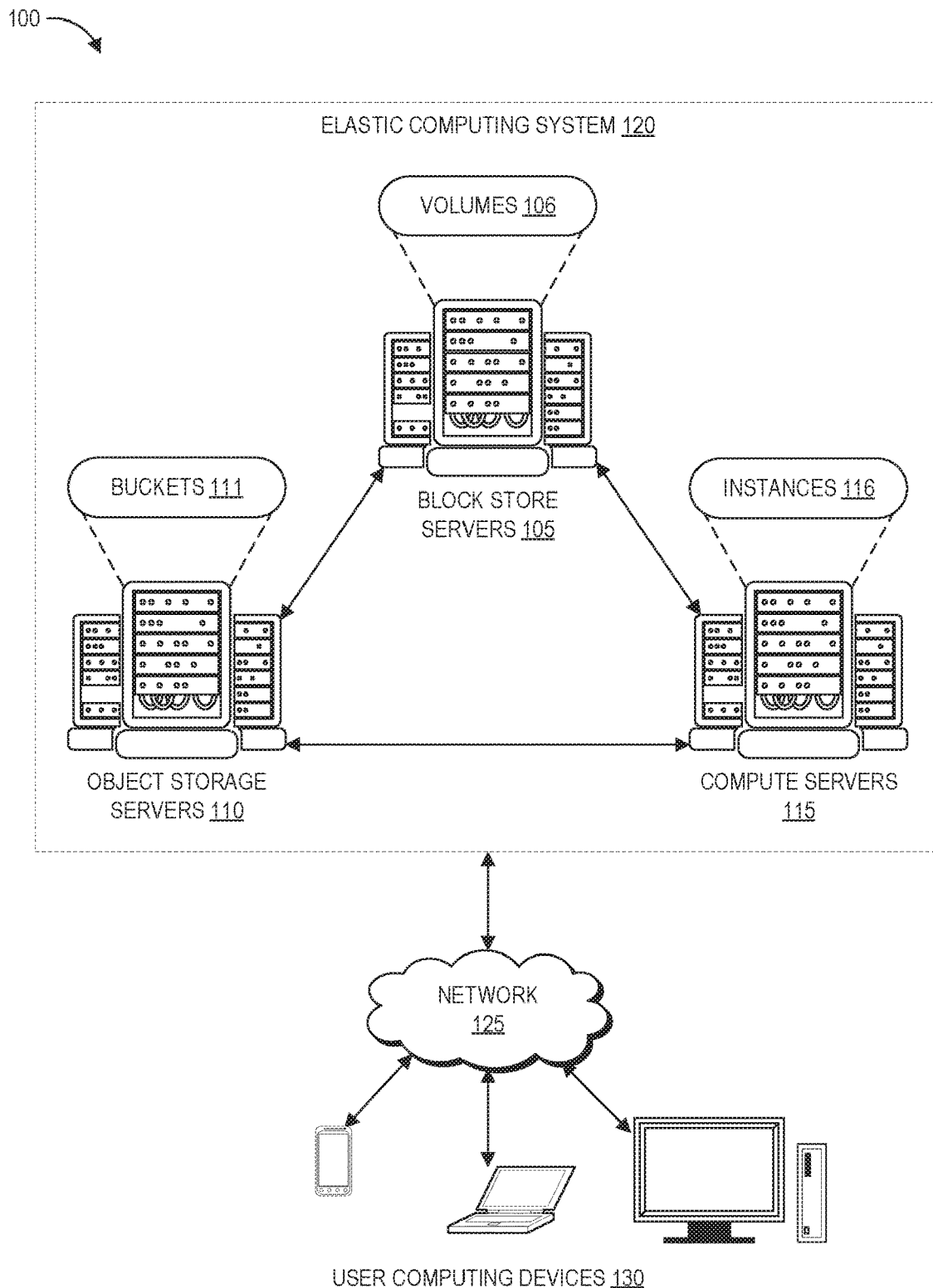
FIG. 1A depicts a schematic diagram of an elastic computing system in which various embodiments according to the present disclosure can be implemented.

Generally described, aspects of the present disclosure relates to the creation and management of a highly distributed data replica instance, for example of volumes of data stored using block storage within a networked elastic computing system. In general, a volume can correspond to a logical collection of data, such as a set of data maintained on behalf of a user. A volume may be replicated multiple times within a computing system, in order to provide multiple replicated instances of the volume (which replicated instances may collectively represent the volume on the computing system). Replicated instances of a volume in a networked elastic computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. However, certain actions such as creating frequent backups or large numbers of copies of a volume can strain the available data communication bandwidth of the hardware on which the volume is stored (e.g., the replicas of the volume). This results in large latencies experienced by the user of the volume.

The aforementioned problems, among others, are addressed in some embodiments by the disclosed techniques for creating and using a highly distributed tertiary replica of a volume. In one example, the primary replica of a volume is typically stored on a single partition or up to sixteen different partitions, with the secondary replica of the volume stored on a corresponding number of different partitions. Each partition may be stored on a different computing device, such as a server in a distributed computing environment, or multiple partitions may be stored on a single computing device. To create the highly distributed tertiary replica of the volume, data of the volume is split into a large number of partitions (e.g., 100, 1,000, a million, or more) that are distributed for storage across a number of different computing devices. This addresses the latency issue by taking advantage of the connection bandwidth of a large number of devices to transfer the data of the volume, rather than the smaller number of devices on which the primary replica or secondary replica is typically stored.

It will be appreciated that the primary and secondary replicas might not reasonably be as massively distributed as the tertiary replica, for example due to a requirement that they handle user reads and writes in real time (e.g., as a user is requesting to read or write from their volume). For example, response times of different servers (or other computer storage devices) can vary, and the response time for the overall volume can be limited by the responsiveness of the slowest server. Thus, the maximum distribution of a primary and secondary replica may be limited in practice, to reduce the likelihood that a user read or write take longer than a threshold time (e.g., as established by a service level agreement, or "SLA"). Rather, by maintaining the primary and secondary replicas on a smaller set of hardware devices, a system may be able to maintain low-latency user experiences during reads and writes to the volume.

Unlike the primary and secondary replicas, a tertiary replica may be massively distributed, as such a replica might not be expected to directly service user reads or writes to a volume. Thus, delays in implementing reads or writes to the volume on a tertiary replica may be permissible. In one embodiment, implementation of such reads or writes to a volume on a tertiary replica may involve asynchronously updated the tertiary replica, based on information contained in the primary or secondary replicas. Asynchronous updating provides a number of benefits, including keeping the tertiary replica up-to-date with any writes to the primary and secondary replicas. Another benefit relates to the fact that updating millions of nodes may be slower than updating the smaller number of nodes of the primary and secondary replicas, so asynchronous updating gives the benefits of fast reads from the tertiary replica without slowing writes at the primary replica.

In one embodiment, the tertiary replica works in complement with the primary and secondary replicas to provide for low user latencies when interacting with the volume in various ways. For example, the primary replica can be configured to facilitate reads and writes (sometimes referred to as "input output operations," or simply "I/O operations") at the volume, thus maintaining user experience with respect to the volume. The secondary replica can be updated synchronously with the primary replica and provide for seamless transition during failover operations, for example if the computing hardware hosting the primary replica fails. Beneficially, the storage architecture of the tertiary replica can be configured to replicate the volume across a high number of computing devices relative to the primary and secondary replicas, thus enabling creation of thousands of clones (e.g., new volumes copied directly from the original volume) simultaneously, enabling faster creation of backup copies, and enabling faster recovery as the highly scaled out tertiary replica enables rapid creation of new copies of the volume than would be possible utilizing only a primary and secondary replica. In one embodiment, the tertiary replica is not synchronously updated with the primary and secondary replicas, and thus is not utilized for standard user I/O operations to the volume. Illustratively, where the tertiary replica is a distributed storage of the data of the volume across a number of partitions, and when data is requested from or written to the tertiary replica, the slowest partitions to respond can cause a delay in the entire operation, referred to as "tail latency". With the tertiary replica stored across thousands or millions of partitions, the likelihood that any one partition will be unavailable or experience a delay at a given time may be high, increasing latency for the I/O operation. As such, the tertiary replica may not be well suited to handling synchronous user I/O operations, but may nevertheless provide benefits for rapid transfer of data out of the volume.

To illustrate, consider the example of a volume of 8 terabytes ("TB") and a data transfer limit of 1 gigabyte ("GB") per second per device. To transfer data out of the volume from a single device would take at least 2 hours, 13 minutes, and 20 seconds (assuming for the sake of example full use of the transfer capacity). The primary and secondary replicas may be split into up to 16 partitions, with the data transfer limit applying on a per-partition basis (e.g., with one partition per device). With 16 partitions, it would still take at least 8 minutes and 20 seconds to transfer the data out of the volume. Thus, the transfer of data out of the volume is fundamentally bound by the number of devices across with the volume is spread. However, if the volume is split into 1,000 devices, then each device only has to push $\frac{1}{1,000}^{th}$ of the data of the volume, and in the current example the time required to transfer the complete data of the volume (from the tertiary replica, rather than the primary or secondary replicas) is reduced to 8 seconds.

Aspects of the present disclosure further relate to utilization of a stream logging system to facilitate logging of interactions with a volume. Specifically, a collection of computing device may implement a "logger fleet," in which modifications to a volume (e.g., as reflected in user I/O operations) are reflected as messages within one or more message streams associated with the volume. As disclosed herein, the logger fleet may enable asynchronous updating of a distributed tertiary replica and a primary and secondary replica, such that logger fleet enables the distributed tertiary replica to be "eventually consistent" with the primary and secondary replica (which replicas may, for example, by synchronously updated). For example, each modification to a volume may be submitted (e.g., by a device implementing the primary replica) to the logger fleet as a message within a stream associated with the volume. The logger fleet may apply a variety of mechanisms, such as data duplication and redundancy, to ensure that the messages submitted to the stream are later transmitted, in a correct order, to a device hosting a distributed tertiary replica for the volume. The device may then regenerate, from each message, a modification to the distributed tertiary replica for the volume, thus placing the third replica in a state matching that of the primary replica at the time the message was generated. The use of a logger fleet may thus offload from a device hosting a primary replica functionalities such as ensuring that each modification is successfully committed in the correct order on a device hosting the distributed tertiary replica.

Use of a logger fleet to record modifications to a volume as a message stream may enable additional functionalities, as described herein. For example, the storage of modifications to a volume as a message stream may enable the elastic compute system disclosed herein to "rewind" operations on a volume, or to otherwise recreate the state of a volume at a specific point in time reflected in the messages of the stream. Illustratively, a user may request that the last n modification operations to a volume be "undone," and the elastic compute system may utilize a stream of messages reflecting those modifications to revert the volume to a state prior to those operations. As another illustration, the system may utilize a stream of messages to generate a point-in-time snapshot of the volume at any state, even if the volume has been modified since it was in that state. Specifically, the system may generate a temporary volume from a known state (e.g., a current state or a prior known state, which may itself be reflected in a snapshot) and apply messages (e.g., reverting messages when working backwards from a later state or implementing messages when working forwards from a state prior to the time at which the new snapshot is desired) to place the temporary volume in the state that the original volume was in at the point in time at which the snapshot is desired. The system may then generate a snapshot of the temporary volume, thus enabling creation of snapshots for a volume at any past point in time reflected within a message stream. As discussed below, the logger fleet may enable a variety of other functionalities with respect to a volume. For example, the elastic compute system may provide an application programming interface (API) through which users may read messages to a volume as held at the logger fleet, thus enabling functionalities such as notifications to a user when modifications meeting certain criteria are detected at the logger fleet.

As noted above, use of a distributed tertiary replica may enable rapid duplication of a volume due to high parallelism provided across the partitions of the distributed tertiary replica. However, there may nevertheless be instances where a desired duplication would require excessive time when using only a distributed tertiary replica. For example, where a user wishes to duplicate a source volume to hundreds or thousands of target volumes, use of a single distributed tertiary replica may require large amounts of time to complete such an operation. To address this, embodiments of the present application enable the implementation and use of additional highly distributed replicas, or portions of those replicas, to facilitate high-scale duplication of a volume. Illustratively, where a user wishes to duplicate a source volume 1000 times, a first highly distributed replica (e.g., a tertiary replica) may be used to create a second highly distributed replica. Each of the two highly distributed replicas may then be used to create an additional highly distributed replica. In this way, the number of highly distributed replicas for a volume may be exponentially increased. When the number of highly distributed replicas for the volume reaches a sufficient level (e.g., a predetermined maximum, a level such that the duplication to target volumes is expected to complete within a threshold period of time, etc.), the collection of highly distributed replicas can then be used to duplicate the source volume to the desired target volumes (e.g., as volumes on a set of block store servers, as virtual disk drives of instances on compute servers, etc.). Thereafter, the additional highly distributed replicas may be removed, to avoid excess use of computing resources in providing such a number of highly distributed replicas.

In some instances, a user may request mass duplication of a volume in its entirety. In such cases, a number of additional highly distributed replicas can be created to facilitate the duplication. These additional replicas are generally referred to herein as "intermediary duplicate" replicas, as the replicas can be used as an intermediary between an initial highly distributed replica (e.g., a tertiary replica) and the target volumes to which mass duplication is requested. In other instances, a user may request mass duplication of only a portion of a volume. For example, a user may wish to copy a single file (e.g., a configuration file) or sector (e.g., a boot sector) of a volume to a large number of target volumes. In such cases, rather than creating additional highly distributed replicas of a volume, one or more partitions of a highly distributed replica may be duplicated. For example, where duplication is requested of a file stored on a single partition of a highly distributed tertiary replica, the block store servers may be configured to duplicate that single partition (e.g., using the exponential process above) until sufficient number of duplicate partitions exist to copy the file to the target volumes (e.g., within a threshold period of time). Such duplicated partitions are generally referred to herein as "intermediary duplicate" partitions, as the partitions can be used as an intermediary between a partition of an initial highly distributed replica (e.g., a tertiary replica) and the target volumes to which mass duplication is requested. Intermediary duplicate replicas (e.g., representing a volume in its entirety) and intermediary duplicate partitions (e.g., representing an individual partition of a highly distributed replica) are collectively referred to herein as "intermediary duplicates."

In one embodiment, creation of intermediary duplicates is facilitated by a centralized authority. For example, a controller may be provided that receives requests to copy information from a highly distributed replica, determines whether the requests satisfy a threshold level for creation of intermediary duplicates, causes creation of the intermediary duplicates, and implements the requested copy of information using the intermediary duplicates. In another embodiment, creation of intermediary duplicates is facilitated by peer-to-peer operation of servers implementing partitions of a highly distributed replica. For example, each server within a collection of services implementing a highly distributed replica may monitor requests to copy information from partitions of the replica on the server, and determine if the requests satisfy a threshold level for creation of one or more intermediary duplicates for the partitions. If so, the server may generate the intermediary duplication partitions by copying a source partition to another server within a collection, and transferring at least a portion of the requests to copy the partition to the other server. As this functionality can be implemented at each server, this peer-to-peer operation can facilitate exponential growth in the number of intermediary duplicates of a partition without requiring centralized control.

As would be appreciated by one of skill in the art, the use of a highly distributed replica and/or logger fleet, as disclosed herein, represents a significant technological advance over prior implementations. Specifically, the use of a highly-partitioned tertiary replica, as disclosed herein, enables an elastic compute system to facilitate rapid replication of a data volume, or to perform other intensive I/O operations on the data volume, without experience the bandwidth or throughput limitations of prior systems. Moreover, the combination of a highly-partitioned tertiary replica with less-highly-partitioned primary and secondary replicas overcomes difficulties in utilizing solely a highly-partitioned replica, such as the potential latencies introduced by a high level of partitioning. Thus, the combination of a highly-partitioned tertiary replica with less-highly-partitioned primary and secondary replicas enables an elastic compute system to be both highly responsive to user I/O operations and to facilitate rapid duplication or intensive I/O operations of a volume. By increasing the speed of these I/O intensive operations while maintaining responsiveness to typical user I/O operations, the present disclosure represents a significant improvement to operation of the elastic compute system. For example, the embodiments disclosed herein can significantly improve the efficiency with which computing resources of the elastic compute system are used, resulting in increased responsiveness of the system and a reduction in total resource usage. The implementation of a logger fleet to store data modification messages for a volume can facilitate the above-noted advantages by, for example, enabling asynchronous updating of the distributed tertiary replica with respect to a less-distributed replica. The logger fleet disclosure herein can also facilitate other improvements to the operation of an elastic compute system, such as an ability to "rewind" operations on a volume or to recreate a volume at a prior state. This ability to revert a volume to a past state addresses long-standing issues within storage devices, such as the difficulty in restoring a device to a past state after erroneous writes to the device (e.g., due to malicious software). Moreover, as would be recognized by one skilled in the art, the embodiments described herein (e.g., the combined use of a highly-partitioned replica with a lower-partitioned replica, the implementation of a logger fleet to store modifications to a volume as a message stream) provide a technical solution to long standing technical problem within the field of information retrieval and data storage, such as the limited bandwidth of individual computing devices, the latency imposed by distributed computing systems, the difficulty of balancing bandwidth and latency concerns across such systems, and the difficulty in ensuring data resiliency in such systems (particularly over time). As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, while embodiments are disclosed herein with reference to a "tertiary" replica, this term is utilized solely for illustrative purposes, with the assumption that the replica is introduced into a system containing two alternative replicas. However, embodiments of the present disclosure may include more or fewer alternative replicas. For example, in one embodiment, a highly-partitioned replica may be used in conjunction with a single less-partitioned replica, or with 3 or more less-partitioned replicas. Thus, references to a primary or secondary replica, as used herein, should be understood to refer generally to an example of a less-partitioned replica (with a volume split between, for example, 1 and 16 replicas, or a number of replicas such that tail latency is not expected to significantly impact responsiveness of standard user I/O operations). Moreover, while embodiments are discussed herein with reference to a highly-partitioned "tertiary" replica, some embodiments of the present disclosure may utilize more than one highly-partitioned replica, any of which may be referred to for simplicity as a "tertiary" replica. Thus, references to a tertiary replica, as used herein, should be understood to refer to a highly-partitioned replica (e.g., with respect to a less-partitioned replica representing the same volume). As discussed below, such a highly-partitioned replica may include a number of partitions sufficient to enable rapid implementation of intensive I/O operations, such as duplication of an entire volume. This number of partitions may be, for example, between 1000 and millions of partitions. Examples provided below may in some instances refer to modifications to a volume as "write operations." The term "write operation" should be understood to refer to any request to modify the data contained within a volume, including a request to write new information to the volume or to modify or delete existing information within the volume.

Overview of Example Computing Environment with Tertiary Replica

FIG. 1A depicts an example computing environment 100 including an elastic computing system 120 in which the disclosed tertiary replica can be implemented. The elastic computing system 120 can be accessed by user devices 130 over a network 125. The elastic computing system 120 includes one or more compute servers 115, one or more object storage servers 110, and one or more block store servers 105 that are in networked communication with one another and with the network 125 to provide users with on-demand access to computing resources including instances 116, volumes 111, and buckets 106, among others. These particular resources are described in further detail below. Some implementations of elastic computing system 120 can additionally include domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The elastic computing system 120 can provide on-demand, scalable computing platforms to users through the network 125, for example allowing users to have at their disposal scalable "virtual computing devices" via their use of the compute servers 115, object storage servers 110, and block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 125. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the compute servers 115, object storage servers 110, and block store servers 105. The data centers within an availability zone and the availability zones within a region are connected to one another through private, low-latency links, for example fiber optic network cables. This compartmentalization and geographic distribution of computing hardware enables the elastic computing system 120 to provide fast service to users on a global scale with a high degree of fault tolerance and stability. To distribute resources evenly across the zones in a given region, the provider of the elastic computing system 120 may independently map availability zones to identifiers for each user account.

Turning specifically to the roles of the different servers within the elastic computing system, the compute servers 115 include one or more servers on which provide resizable computing capacity to users for building and hosting their software systems. Users can use the compute servers 115 to launch as many virtual computing environments, referred to as "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data is lost.

The block store servers 105 provide persistent data storage for the compute servers 115 in the form of volumes 106. The block store servers 105 include one or more servers on which data is stored in as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data can be, for example, 512 bytes, 1 kilobyte ("kB"), 4 kB, 8 kB, 16 kB, 32 kB or larger, depending upon the implementation. The partitions of the tertiary replica can be the size of one block or of multiple blocks. For example, the partitions of the tertiary replica can be sized as a number of blocks equal to the size of the minimum storage unit used by the object storage servers 110, or the number of blocks that maximizes throughput to the object storage servers 110. For example, where the object storage servers 110 implement a minimum storage unit of 1000 blocks (e.g., 1 megabyte of data when blocks are 1 kB in size), each partition of a tertiary replica may be 1000 blocks (1 megabyte) in size. In contrast, typical partitions of the primary and secondary replicas range from 8 GB to 62.5 GB (or greater) in size, depending for example upon the size of the user volume.

User volumes 106, which can be treated as an individual hard drive ranging for example from 1 GB to 1 terabyte TB in size, are made of one or more blocks stored on the block store servers 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the elastic computing system 120 that has the ability to transfer data at around 1 GB per second ("Gbps") in some implementations. These volumes provided persistent, dedicated storage that can be attached to particular instances of the compute servers 115. Each volume may be attached to a single instance running on a compute server 115, and can be detached from that instance and re-attached to another. As described in more detail with respect to FIG. 1B, the block store servers 105 have built-in redundancy for volumes by replicating the volume across multiple servers within an availability zone, which means that volumes will not fail if an individual drive fails or some other single failure occurs.

The object storage servers 110 represent another type of storage within the elastic computing environment 120. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, so authorized access to them can be obtained through requests from networked computing devices in any location. Each bucket is associated with a given user account. Users can store as many objects as desired within their buckets, can write, read, and delete objects in their buckets, and can control access to their buckets and the contained objects. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of object storage's vast scalability and metadata characteristics. The object storage servers 110 can support highly parallel data accesses and transfers.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the instances and volumes described above, they can also be used to provide data backup as described below with respect to snapshots (e.g., object-stored backups of volume data).

The elastic computing system 120 can communicate over network 125 with user devices 130. The network 125 can include any appropriate network, including an intranet, the Internet, a cellular network, a local area network or any other such network or combination thereof. In the illustrated embodiment, the network 125 is the Internet. Protocols and components for communicating via the Internet or any of the other aforementioned types of communication networks are known to those skilled in the art of computer communications and thus, need not be described in more detail herein. User devices 130 can include any network-equipped computing device, for example desktop computers, laptops, smartphones, tablets, e-readers, gaming consoles, and the like. Users can access the elastic computing system 120 via the network 125 to view or manage their data and computing resources, as well as to use websites and/or applications hosted by the elastic computing system 120.

Users can instruct the elastic computing system 120 to create snapshots of their volumes stored on the block store servers 105. In one embodiment, a snapshot is a point-in-time block-level backup of the volume, stored as a copy of data on the volume on one or more of the object storage servers 110 (e.g., as a single object or a collection of objects). In addition or as an alternative to managing snapshots through general interfaces for the object storage servers 110, snapshots may be managed through the application programming interface ("API") of the block store servers 105. In one example, snapshots are implemented as incremental records of data within a volume. Illustratively, when the first snapshot of a volume is taken, all blocks of the volume that contain valid data are copied as one or more objects to the object storage servers 110, and then a snapshot "table of contents" or "manifest" file is written to the object storage servers 110 that includes a record of the one or more objects, as well as the blocks of the volume to which each of the one or more objects correspond. Due to the use of incremental snapshots, when the subsequent snapshots are taken of the same volume, only the blocks that have changed since the first snapshot need be copied to the object storage servers 110, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of instances to create a new virtual machine instance of that instance.

Figure 1B:
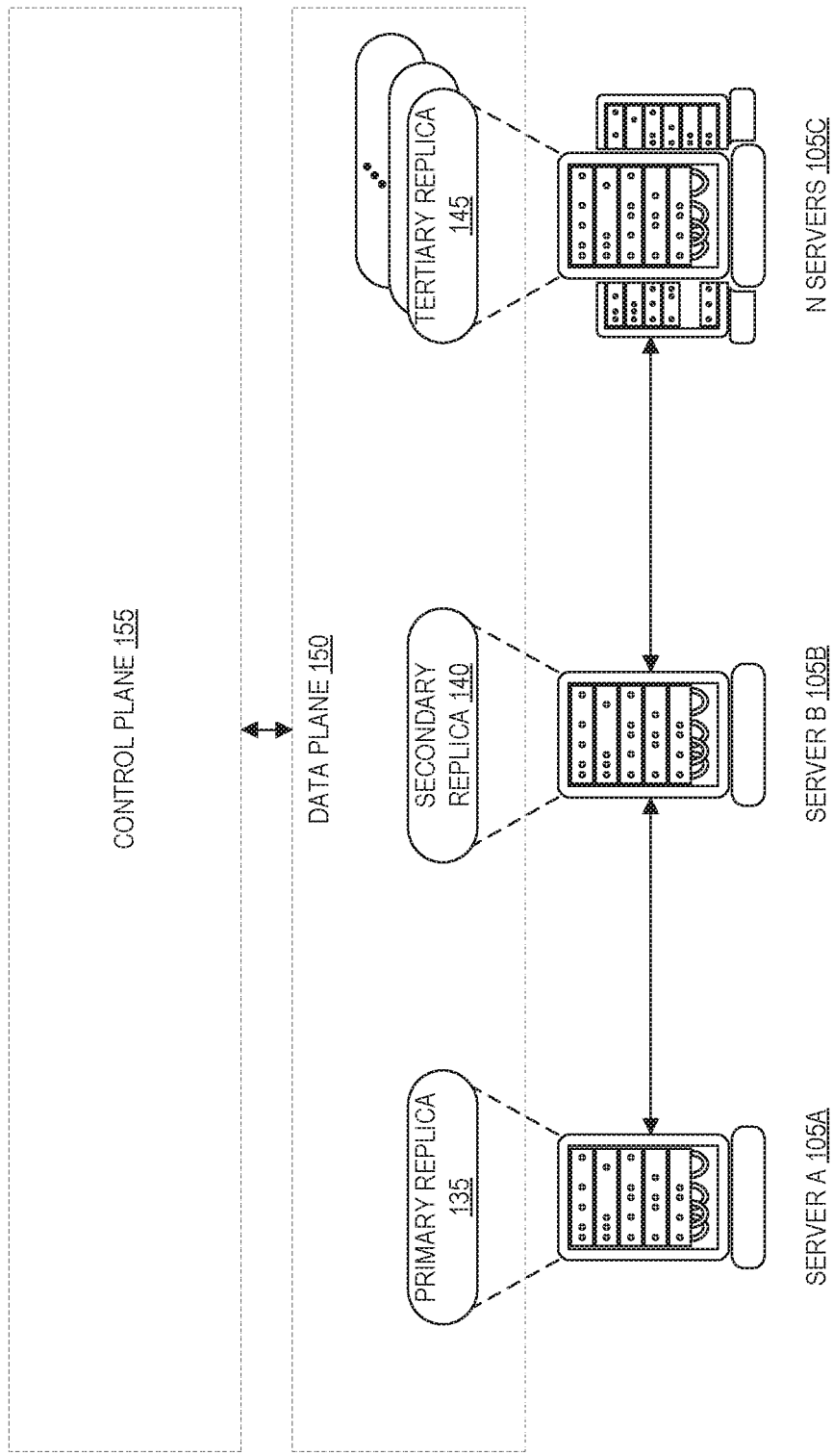
FIG. 1B depicts a schematic diagram of replicated data instances according to the present disclosure within the elastic computing system of FIG. 1A.

FIG. 1B depicts an example of how the block store servers 105 can be configured to store primary, secondary, and tertiary replicas of volumes, according to embodiments of the present disclosure. The block store servers 105 are configured to mirror the content of block devices between servers 105 and synchronously replicate data across redundant servers. FIG. 1B also depicts a data plane 150 and a control plane 155 of the elastic computing system 120. The data plane 150 represents the movement of user data through the elastic computing system 120, while the control plane 155 represents the movement of control signals through the elastic computing system 120. One skilled in the art will appreciate that the data plane 150 and control plane 155 represent logical constructs related to the operation of servers 105, rather than a physical configuration of the servers 105.

The control plane 155 is a logical construct that can be implemented by at least one server with computer-executable software for coordinating system and user requests and propagating them to the appropriate servers in the elastic computing system 120. Functions of the control plane 155 include replication of data, failover operations, and receiving requests from users for specific actions to be performed with respect to the data plane 150. These can include creating, cloning, and snapshotting volumes 106. The data plane 150 in the illustrated embodiment is implemented by execution of operations on the primary replica 135, secondary replica 140, and tertiary replica 145.

As described above, user I/O operations can be executed at the primary replica 135, with a block-level replication mechanism replicating the information synchronously with a secondary replica 140. The primary replica 135 and secondary replica 140 can be provisioned on different block store servers 105A, 105B for heightened data integrity. Though the servers 105A, 105B are depicted as a single server, in some implementations the primary replica 135 and secondary replica 140 may each include a number of partitions, and each partition may be stored on a different server. Both the primary and secondary replicas of the volume can have installed a block level replication mechanism that allows any I/O operation to the primary replica 135 to be replicated to the secondary replica 140. Various mechanisms for providing synchronous I/O operations to a volume across multiple replicas are known in the art, and thus will not be described in detail herein. Any failure or outage of the primary replica 135 can be addressed by performing a failover operation to the secondary replica 140. A DNS name or other such approach can be used such that the name can be aliased to the secondary replica 140 during a failover, such that there is no action needed on the part of the user to utilize the "new" primary replica. Alternatively, a server hosting an instance that is attached to the primary replica can have stored in memory the IP address of the volume, volume ID, or other identifying data to connect to the secondary replica or the IP address of a control plane system that can provide the aforementioned data in the event a failover occurs. The provisioning of the replicated volume and creation of new volumes can controlled by the control plane 155.

The primary and secondary replicas can be partitioned into a maximum of 16 partitions. Generally described, partitioning is the creation of one or more regions on computer storage so that an operating system can manage information in each region separately, with each partition being as a distinct "logical" storage device that uses part of the physical computer storage. Each partition may be hosted by a distinct device of the elastic computing system 120 and have a functional data transfer limit up to the computing resources available to the host device on which the partition is implemented. For example, where a partition is hosted on a physical device with a 1 Gpbs network interface, the partition may have a functional data transfer limit of 1 Gbps (or less, in instances where the host device hosts multiple partitions which must be sent over the network interface at the same time). As described above, this functional data transfer limit results in latencies for certain user actions that require significant transfer out of the data of the volume, particularly for large volumes of data. For example, a user may create many clones of an instance and may also wish to clone the associated volume to attach to each new instance. This can be beneficial, as an example, where a user volume includes real-time market data, and the user desires to run a thousand experiments testing different algorithms for analyzing the data and push out the best algorithm by the next trading day. Such experiments are conducted on the basis of software residing within a volume, and thus cloning the volume to 1000 machines allows the experiment to run. It will be appreciated that this is just one illustrative example of a user need for creating a large number of clones within a short timeframe. The data transfer bandwidth of the primary and secondary replicas is limited by the functional data transfer limit of the source devices on which the partitions are hosted, and the control plane 155 also may reserve some of this bandwidth to support I/O operations at the primary replica 135 and synchronous replication of blocks to the secondary replica 140 (e.g., such that standard user I/O operations may continue during a cloning operation).

In contrast, the tertiary replica 145 can be split into a larger number of partitions than the number of partitions of the primary and secondary replicas. In some embodiments, this number can range from 1,000 partitions to 32 million partitions (e.g., one partition per volume block). In some embodiments, lower numbers of partitions can be used for the tertiary replica, for example a certain number that enables an entire volume to be cloned or snapshotted within a threshold period of time. In this example, bandwidth of network interfaces, bandwidth to the object store, size of the volume, and a target completion time can be used to determine the number of partitions to use. Beneficially, the increased number of partitions increases the total available bandwidth for transferring the data of the tertiary replica. Each partition can include one or more blocks of the volume, and these partitions can be stored in containers at different devices of the elastic computing system 120. In an embodiment, a container stores raw unstructured binary files, for example binary large object ("BLOB") data files, and returns them back when queried. The control plane 155 can divide the data of a volume (e.g., as stored in a primary or secondary replica) into individual partitions, each of which may be stored on any container in the elastic computing system 120 (or a designated region or availability zone thereof) that has capacity. These containers can be append-only and can be sealed once the storage space of the container is fully used (e.g., any remaining portion of storage is too small to store another partition of a tertiary replica). For redundancy, in some implementations the container servers can be configured with computer-executable instructions to replicate multiple copies of the containers.

The tertiary replica 145 can be considered as new resource within the elastic computing system 120 to accelerate snapshotting and cloning of volumes. This tertiary replica 145 beneficially reduces bottleneck on multi-tenant servers in the elastic computing environment 120, where one user may, for example, request to make 1,000 clones of their volume and use up the connection bandwidth of the server to the detriment of other users. In one embodiment, the tertiary replica 145 might not be exposed directly to users, though it may be configured to support their snapshotting and cloning requests. Some embodiments may maintain multiple copies of the tertiary replica, for example to support feeding the creation of multiple new volumes in parallel. The distributed storage of the tertiary replica 145 provides a number of benefits, including taking advantage of the high parallelism but low throughput connections to buckets on the object storage servers 110, as well as being able to drive high throughput on the block store servers 105. Additional details regarding creating, storing, and using the tertiary replica 145 are described in further detail below.

Overview of Example Tertiary Replica

Figure 2A:
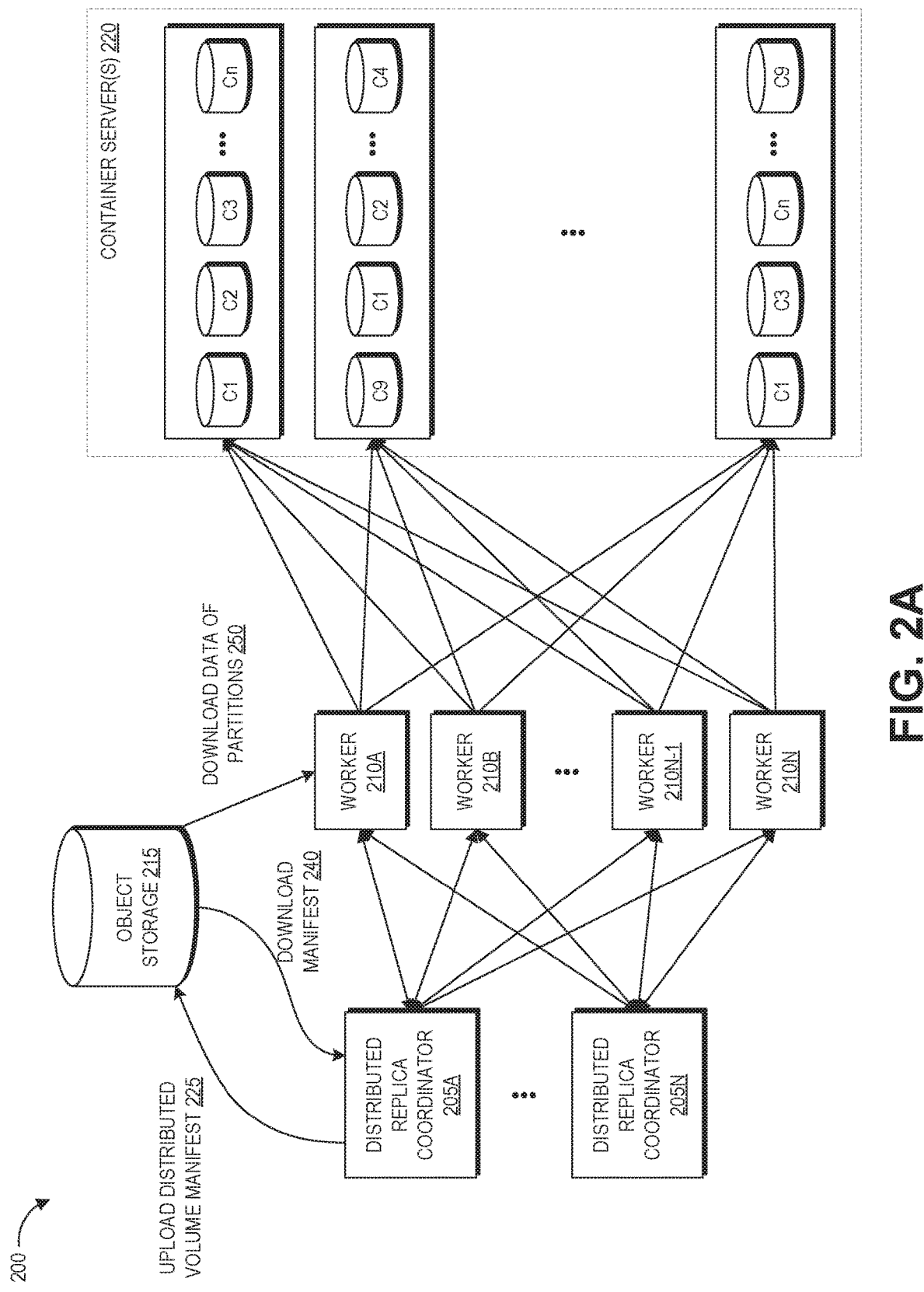
FIG. 2A depicts a schematic diagram of creating a distributed tertiary replica within the elastic computing system of FIG. 1A.

FIG. 2A depicts a schematic diagram 200 of creating a distributed tertiary replica within the elastic computing system 120, for example an implementation of the tertiary replica 145 of FIG. 1B. The tertiary replica is not depicted in FIG. 2A as the partitions of this replica are stored in the containers C1-Cn. A "static" distributed tertiary replica refers to a tertiary replica that does not receive block-level updates, synchronously or asynchronously, from the primary or secondary replicas. Although this particular example can be created as a static distributed tertiary replica, in some embodiments this replica can later receive updates from the primary or secondary replicas, for example by connection to a logger fleet as described with respect to FIGS. 3A and 3B.

The object storage 215 can be one or more buckets of the object storage servers 110 described above that includes a snapshot of a volume. In the illustrated embodiment, the distributed replica coordinator 205A, 205N is the component that drives the creation of the distributed tertiary replica from snapshots stored in the object storage 215. Other embodiments can create the tertiary replica without reaching into the object storage 215, for example by creating it directly from the primary and/or secondary replicas.

There may be a number of distributed replica coordinators 205A, 205N, for example one per tertiary replica that is being updated by the logger fleet 315. Illustratively, the workers 210A-210N are a stateless worker fleet that downloads data to be stored in each partition (or a range of partitions) as directed by the distributed replica coordinator 205A, 205N. The distributed replica coordinator 205A, 205N and workers 210A-210N can be a data stream handling client, running for example as an instance on a compute server 115.

The workers 210A-210N store the tertiary replica partitions in containers C1-Cn on the container servers 220, for example selecting any container with capacity and directing a tertiary volume partition to the selected container. In the illustrated example each container is replicated across a number of the servers 220 for fault tolerance, however other implementations may not replicate the containers. Each container C1-Cn is essentially a partition of one of the container servers 220. Each container C1-Cn can have capacity to store a number of tertiary volume partitions. In one embodiment, each container C1-Cn includes an append-only key value store that stores key/values as long as it has capacity and returns the stored data on demand. Unlike the above-described volume partitions which belong to a single volume of a user, the containers C1-Cn can be multi-tenant in that they may store data from multiple volumes of different users.

The container servers 220 can be dedicated ones of the block store servers 105, or can be shared with block store servers 105 storing volumes described above. Although a snapshot stored in the object storage servers 110 can also be considered as a copy of the primary replica, each connection between the block store servers 105 and the buckets of the object store servers 110 is typically low throughput with high latency, while the elastic block store serves 105 within a given availability zone are typically connected with high throughput, low latency connections. Accordingly, by using the tertiary replica stored on the container servers 220 instead of a snapshot stored on the object storage servers 110, the time required for transferring the data of an entire volume into a new volume can be reduced from hours to minutes.

Figure 2B:
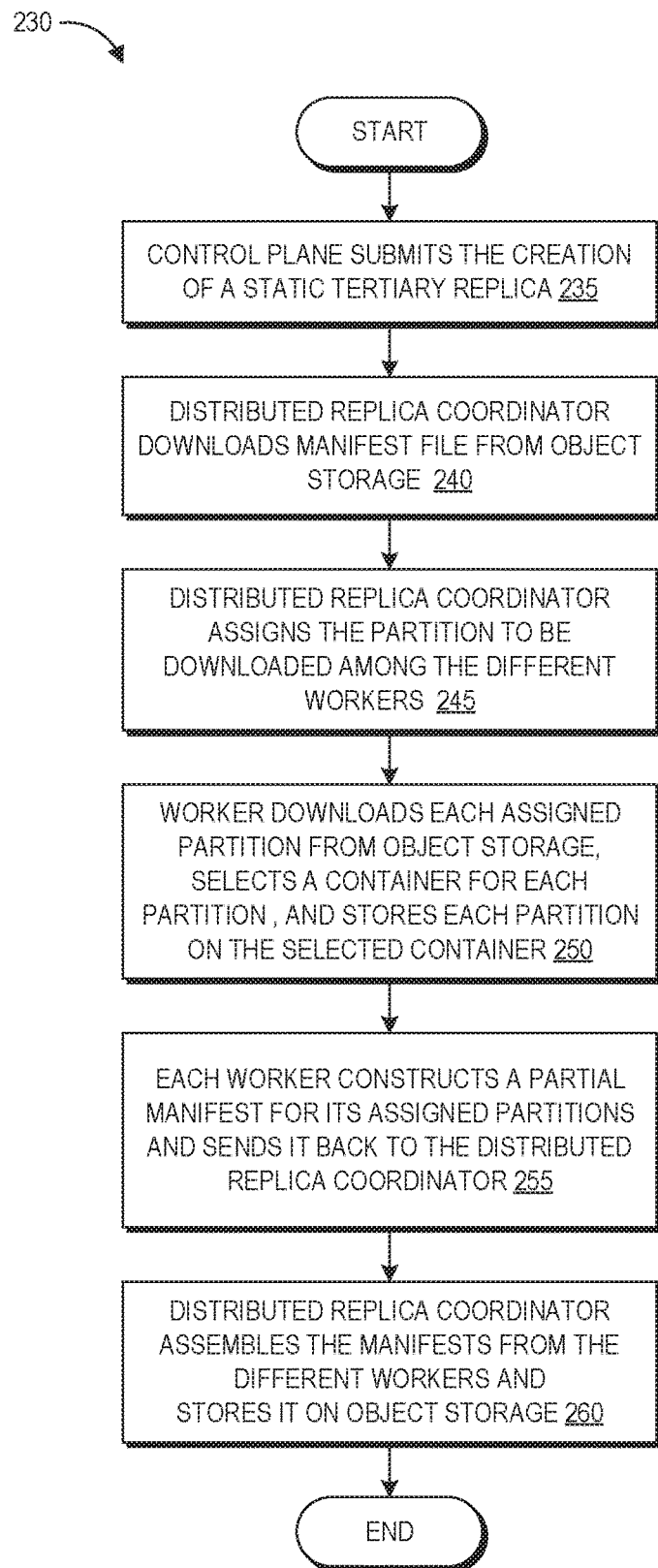
FIG. 2B is a flowchart of an example process for creating the distributed tertiary replica of FIG. 2A.

FIG. 2B is a flowchart of an example process 230 for creating the distributed tertiary replica of FIG. 2A. The process 230 can be performed under control of the control plane 155 of the elastic computing system 120 in some embodiments.

At block 235, the control plane 155 submits the creation of a tertiary replica. This can involve identifying a particular volume on the block store servers 105, confirming that the volume has been snapshotted, and if not creating a snapshot of the volume. In other embodiments, the data for the tertiary replica can be drawn directly from the primary and/or secondary replicas.

At block 240, the distributed replica coordinator 205A, 205N downloads an object manifest file from object storage 215. The object manifest file can identify the storage locations of objects representing the blocks of the volume.

At block 245, the distributed replica coordinator 205A, 205N assigns to each worker 210A-210N one or more partitions of the tertiary replica based, for example, on the capability of each worker and the number of blocks per partition. Greater numbers of partitions can increase the ease of re-creating (e.g., from a snapshot) certain partitions that become unavailable, duplicating the partitions on the container servers 220 to account for high demand (e.g., in the case that a device or partition is being highly used for data transfer), and using unused capacity. However, each partition of the primary replica may be required to maintain connections to a corresponding subset of the partitions of the tertiary replica (see, e.g., FIG. 5A), and also has a maximum number of connections it can maintain. Accordingly, the number of partitions within a tertiary replica can be a tradeoff between these interests, depending upon particular system configurations.

At block 250, the different workers 210A-210N downloads the blocks of the partitions for which they are responsible from object storage 215. Each worker also selects a container for each partition for which it is responsible, for example based on identifying any container that has capacity, and then generates the partition on the selected container by including within the partition the downloaded block data. In one embodiment, the partitions can be striped across the containers, where striping refers to segmenting logically sequential data so that consecutive segments are stored on different physical storage devices. This process of selecting a container for each partition can ensure that the partitions are more or less geographically diverse within a data center, for example so that a majority of the partitions are not sharing the same switch. Further, the process of selecting containers can take into account the bandwidth contention on candidate hosts such that partitions are not put on "hot" storage hosts (e.g., hosts using a majority or most of their connection bandwidth).

At block 255, each worker constructs a partial manifest for the partition it is responsible for and sends it back to the distributed replica coordinator. These partial manifests can be a mapping from partition-ID (or block-ID) to container-ID, and the partial manifests can be assembled into a manifest file that identifies storage locations of the partitions of the tertiary replica. The distributed storage of the tertiary replica 145 creates the challenge of finding all the containers that have the blocks for a given volume. The manifest file is a solution to this challenge, as it maps each partition of the tertiary replica to the container that has the partition. If a partition is unavailable when requested, the control plane 155 can use the object manifest file to identify the location of a snapshot representation of the partition on the object storage servers 110 and re-drive the download from the snapshot.

At block 260, the distributed replica coordinator 205A, 205N assembles the partial manifests from the different workers 210A-210N into a complete distributed volume manifest (e.g., from partition-ID to container-ID for all of the partitions of the distributed tertiary replica) and stores it on object storage 215. Once this is completed, the distributed replica coordinator 205A, 205N can notify the control plane 155 and the process 230 ends.

Overview of Example Updates to Tertiary Replica

Figure 3A:
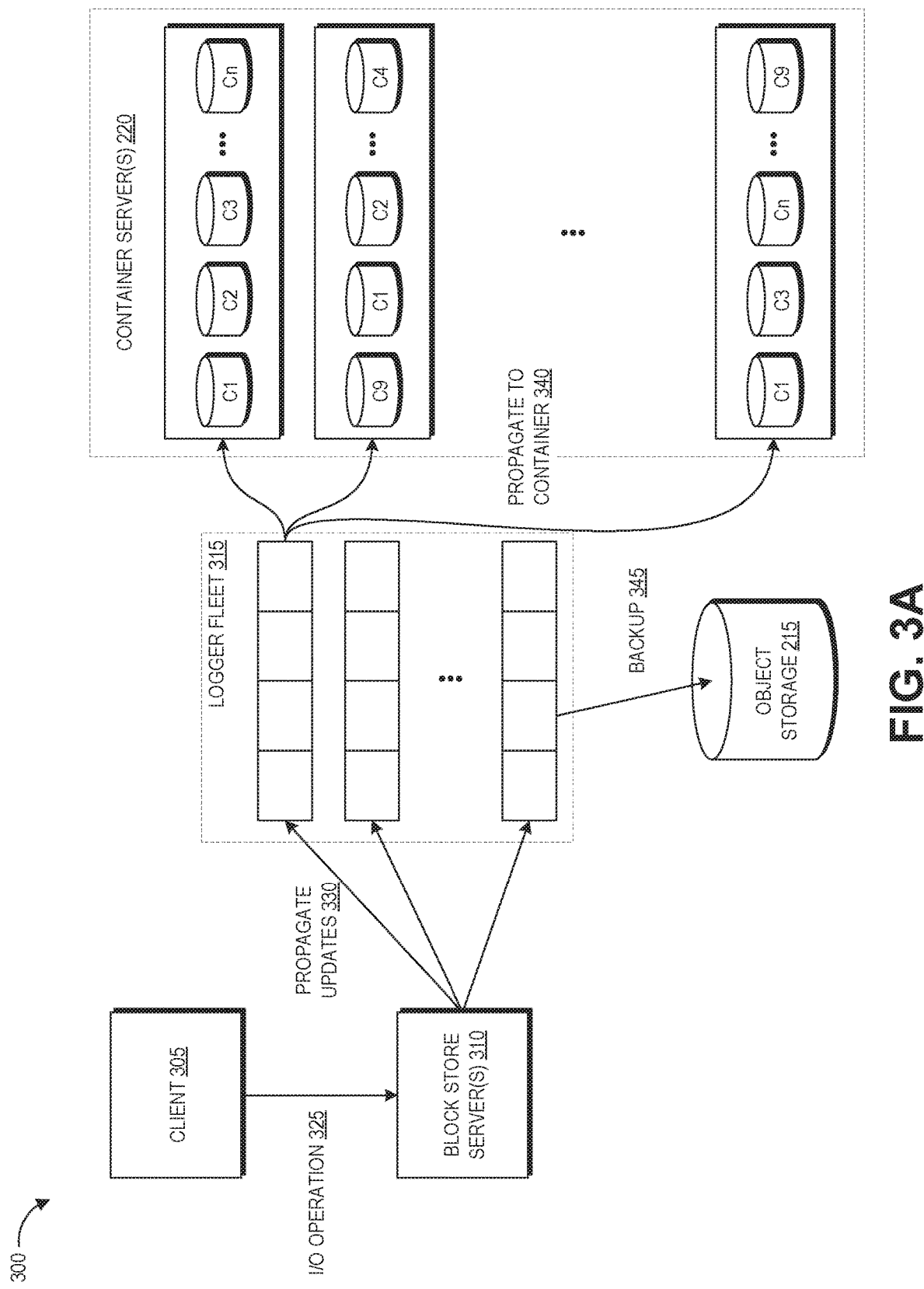
FIG. 3A depicts a schematic diagram of replicating data updates between a primary replica and a distributed tertiary replica within the elastic computing system of FIG. 1A.

FIG. 3A depicts a schematic diagram 300 of replicating data updates between a primary replica and a distributed tertiary replica within the elastic computing system 120, for example the tertiary replica 145 of FIG. 1B. The tertiary replica is not depicted in FIG. 3A as the partitions of this replica are stored in the containers C1-Cn. This implementation of the distributed tertiary replica 145 is maintained as an asynchronous copy of the primary replica.

A user can perform I/O operations at the primary replica via the client 305. The primary replica is illustratively stored on a first block store server 310 of the block store servers 105. This server 310 can maintain a log of updates and use this log to update the tertiary replica, for example via the logger fleet 315 as described below. The secondary replica is stored on a second block store server (not illustrated). Although FIG. 3A depicts the server 310 of the primary replica as propagating updates 330 to the logger fleet 315, in other implementations propagation of updates 330 to the logger fleet 315 can be performed by the server of the secondary replica, as the secondary replica is maintained synchronously with the primary replica, for example to preserve more bandwidth of the first server for handling the I/O operations 325.

As described with respect to FIG. 2A, the distributed tertiary replica is stored as thousands or millions of partitions of the volume in the containers C1-Cn on the container servers 220. However, in this embodiment the distributed tertiary replica receives block-level updates from the primary replica. While the geographic diversity of the partitions of the tertiary replica may introduce greater latency for update replication than would be experienced by the secondary replica, this can be acceptable in light of the increase in parallel data transfer ability from the tertiary replica. While the secondary replica is replicated synchronously (e.g., simultaneously with writes of data to the primary replica), updates to the tertiary replica can be replicated asynchronously (e.g., after writes of data to the primary replica). For example, if a user requests to create a snapshot or a clone and the tertiary replica will be used for this, updates can be propagated to the tertiary replica to ensure that it is up to date. Thereafter, the tertiary replica can be "frozen" while the snapshot or clone is created from the tertiary replica. While frozen, the tertiary replica can temporarily hold any new writes to the primary replica while it transmits its data to a clone or a snapshot, and can sequentially write these updates to the appropriate partitions after completing the cloning or snapshotting process.

In the example embodiment, the logger fleet 315 is an intermediary between the tertiary replica and the primary replica. The logger fleet 315 can be a data stream handling client, running for example as one or more instances on one or more compute servers 115. Illustratively, the logger fleet 315 may be implemented via the AMAZON KINESIS™ service, or via APACHE KAFKA™ software, the operation of which are known in the art. By utilization of the logger fleet 315, logic for keeping the tertiary replica up-to-date can be offloaded from the elastic block storage server 310, and memory use of the block store server 310 can be reduced.

Illustratively, the logger fleet 315 receives updates from the primary replica and applies them in a serial manner on to the tertiary replica. The logger fleet 315 may pull the updates from the primary replica or the primary replica may push the updates to the logger fleet 315. Specifically, the logger fleet 315 receives the updates 330 from the block store server 310 and then propagates these updates to the appropriate ones of containers C1-Cn. If a container server is down, without the logger fleet 315 some embodiments of the primary replica may back up on the update log, and this may trigger the control plane 155 to start throttling user I/O operations. Beneficially, in the illustrated embodiment the primary replica can send its updates to the logger fleet 315, which can store them for a period (e.g., 24 hours). The logger fleet 315 can update the tertiary replica during this time period. The logger fleet 315 can have a number of workers that each receive sequential updates forming a stream (e.g., a change log of updates to a volume) and propagate the updates the tertiary replica. In some embodiments, the logger fleet 315 can manage a number of tertiary replicas of different volumes, and the log stream can represent the change logs of sequential updates to these different volumes.

In an alternate embodiment, rather than the logger fleet 315, a master-slave architecture can be used to push updates to the tertiary replica, wherein the primary replica is the master and the secondary replica is the slave that pushes updates to the tertiary replica. The master can know where each partition of the tertiary replica is stored and can also maintain a log of how up-to-date these partitions are. The master may update the slave, which can then push updates to the tertiary replica. The primary and/or secondary replicas can receive acknowledgement of the writes to the tertiary replica. For any updates that do not have a corresponding acknowledgement, the primary and/or secondary replicas can resend that update to the appropriate partition of the tertiary replica.

Some embodiments can beneficially position the logger fleet 315 between the master and the slave, such that the master updates the logger fleet 315 and the logger fleet 315 updates the slave. The master just has to make sure that the logger fleet 315 receives the updates, and then the logger fleet 315 confirms that the updates are received by the tertiary replica. One benefit provided by the logger fleet 315 compared to the master-slave approach is that it enables a greater degree of partitioning and/or distribution of the tertiary replica. If the master is pushing updates out to the tertiary replica, the master may be required to have all the metadata and logic for the tertiary replica within itself.

Figure 3B:
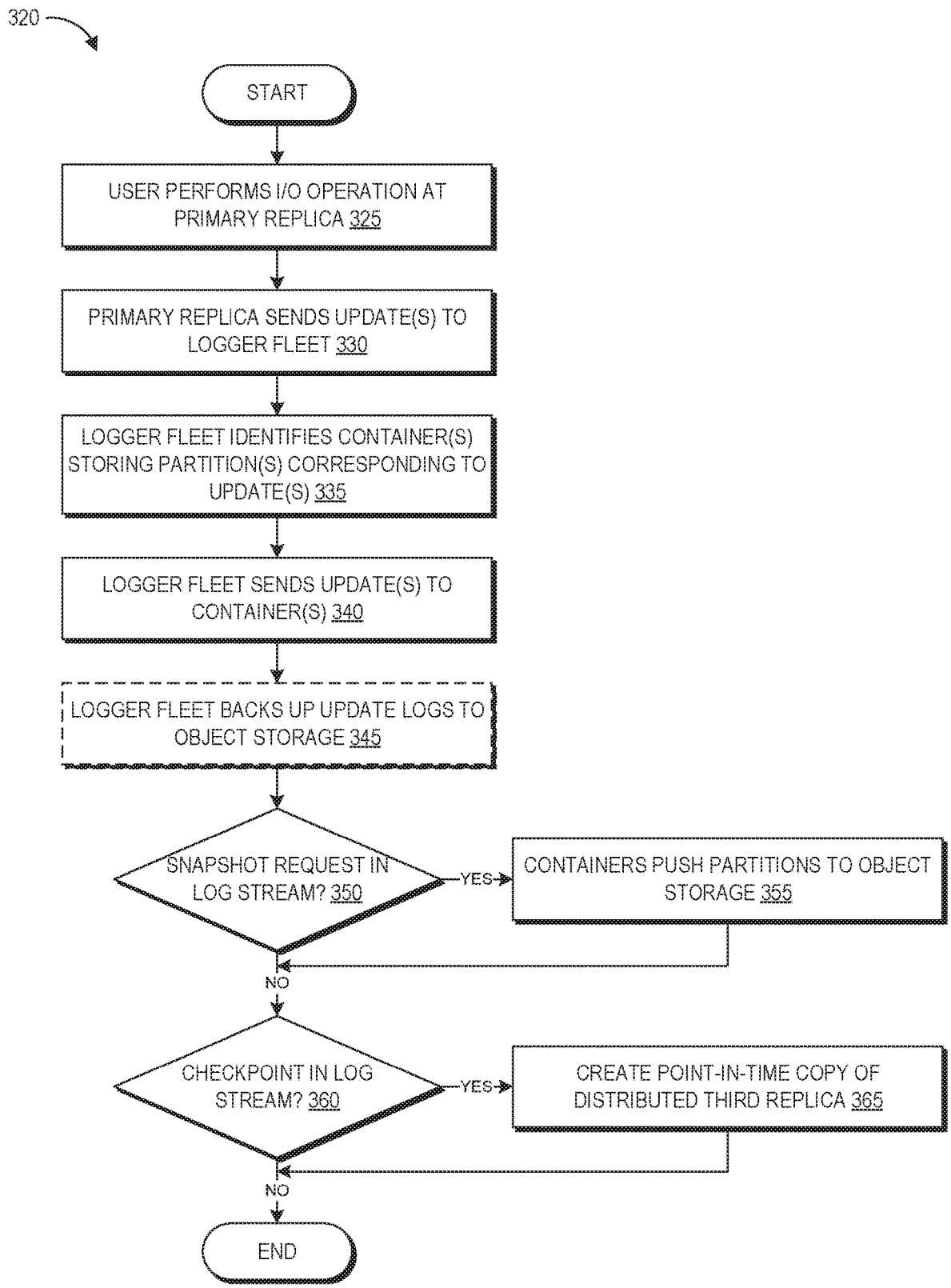
FIG. 3B is a flowchart of an example process for updating the distributed tertiary replica of FIG. 3A.

FIG. 3B is a flowchart of an example process 320 for updating the distributed tertiary replica of FIG. 3A. The process 320 can be performed under control of the control plane 155 of the elastic computing system 120 in some embodiments.

At block 325, the user performs an I/O operation at the primary replica. This can include for example a write of new data, change of existing data, or deletion of existing data.

At block 330, the primary replica sends this update to the logger fleet 315 as described above. The update can be part of a log stream that includes a sequence of updates and other commands (e.g., snapshot and clone commands). The logger fleet 315 can be provided with intelligence to reject out of sequence updates.

At block 335, the logger fleet 315 identifies any containers storing partitions corresponding to the update. This can include identifying blocks of the volume that have been changed and looking up the containers storing partitions corresponding to those blocks in the distributed volume manifest.

At block 340, the logger fleet 315 sends the updates to the containers to update the tertiary replica in accordance with the update. This can be done asynchronously. As described above, if a portion of the tertiary replica is unavailable, the logger fleet 315 can hold its updates until that portion becomes available. In some examples, if user I/O is using the bandwidth to the first two replicas, the primary and secondary replicas can delay propagation of updates to the tertiary replica to maintain the user experience.

Optionally, at block 345 the logger fleet can back up the update logs to object storage 215. This can function similarly to a snapshot backup in allowing creation of new volumes using the update log. As such, in some embodiments the update logs in the object storage 215 can be cleared if a snapshot is taken of a volume, and thereafter new update logs can be periodically backed up to the object storage. A new volume can be created by using the update logs to update the snapshot. As such, storing the update logs in object storage 215 provides for more fine-grained data recovery than storing snapshots alone. As described above, the object storage servers 110 can be configured to replicate buckets across availability zones, while the block store servers 105 may only replicate volumes within an availability zone. Thus, backing up the update logs to object storage 215 can increase the likelihood that the user's data will persist even in the event of availability zone failure.

At decision block 350, the logger fleet 315 determines whether the log stream includes a snapshot request. A snapshot request can be part of the log stream so that by the time it reaches the tertiary replica, the tertiary replica has received any updates needed for the snapshot. If there is a snapshot request, at block 355 the containers push their partitions to object storage 215, thus creating a snapshot of the tertiary replica at the time of the snapshot request. For example, the primary replica can inject snapshot requests into the log stream. Each of the logging machines in the logger fleet 315 would propagate the message to the partitions of the tertiary replica, which can store data within the partitions as objects to the object storage 215 in a parallel manner, thus facilitating rapid creation of a snapshot. This parallelization of snapshotting can create snapshots much more rapidly than waiting for the primary or secondary replica to push the same amount of data to the object storage 215. Alternative, if no snapshot request is within the log stream, the process transitions to block 360.

At decision block 360, the logger fleet 315 determines whether the log stream includes a checkpoint request. If so, at block 365 the containers are used to create a new tertiary replica representing the volume at that time instant as described above with respect to the process 230. For example, the primary replica can inject checkpoint requests into the log stream. The logger fleet 315 can then transmit that checkpoint request to every partition of the tertiary replica. Each partition of the tertiary replica can then push out its data to a new partition within the same or another contain, thus creating an additional, point-in-time copy of the tertiary replica.

Overview of Example Clone Generation from Tertiary Replica

FIG. 4A depicts a schematic diagram 400 of creating a clone of a volume from a distributed tertiary replica within the elastic computing system 120. As described herein, due to its highly distributed nature the tertiary replica supports a high degree of parallelism where many pieces of data of a given volume can be transferred simultaneously. The clone is created as target volume 401 that has a determined number of partitions 405 (its "geometry"). The partitions 405 can be stored on one or more of the block store servers 105 described above.

Figure 4B:
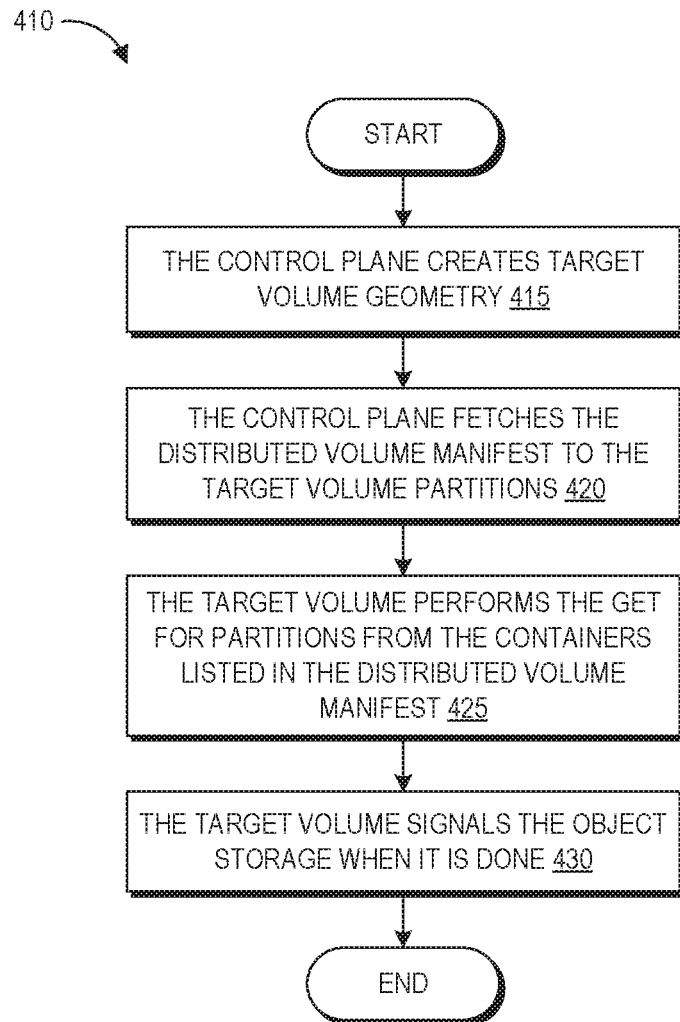
FIG. 4B is a flowchart of an example process for clone generation from a distributed tertiary replica according to FIG. 4A.

Further explanation of the interactions of FIG. 4A will be described with reference to FIG. 4B. Specifically, FIG. 4B is a flowchart of an example process for clone creation of a new data volume (e.g., as a primary and secondary replica of the volume) based on information stored within a distributed tertiary replica according to FIG. 4A. The process 410 can be performed under control of the control plane 155 of the elastic computing system 120 in some embodiments.

At block 415, the control plane 155 creates a target volume 401 on the partitions 405. The target volume 401 refers to the new volume that will be created using the tertiary replica.

At block 420, the control plane 155 fetches the distributed volume manifest from object storage 215 and stores the manifest (or portions of the manifest) on the target volume partitions 405. As described above, the distributed volume manifest maps the partition-ID to the container-ID for each partition of the tertiary replica. In some implementations, each partition of the target volume 401 can be provided with a relevant subset of the distributed volume manifest identifying the container locations of tertiary-replica-partitions that will be written to the target volume partition.

At block 425, each partition of the target volume retrieves, from the relevant containers, the data of partitions listed in the relevant portion of the distributed volume manifest. If there is a "get" fault, that is, a user of the volume tries to access data of a partition that has not yet been retrieved to the target volume, then the target volume 401 can perform a get on to the container hosting that partition. FIG. 4A depicts a single fetch of a single partition of the tertiary replica to a corresponding partition 405 of the target volume 401, and such fetching could illustratively be repeated until each needed partition of the tertiary replica has been fetched. Although FIG. 4A shows a single arrow leading from each container server 220 to one of the partitions 405, it will be appreciated that this is for purposes of simplicity and clarity in the figure, and that each partition may receive data from a number of or all of the container servers 220. If a container is un-responsive, the target volume 401 can use the object storage manifest described with respect to FIGS. 2A and 2B to retrieve the data of the partition identified within the distributed volume manifest from object storage.

At block 425, the target volume 401 signals the object storage 215 when it is done creating the new volume.

Overview of Example Snapshot Generation from Tertiary Replica

Figure 5A:
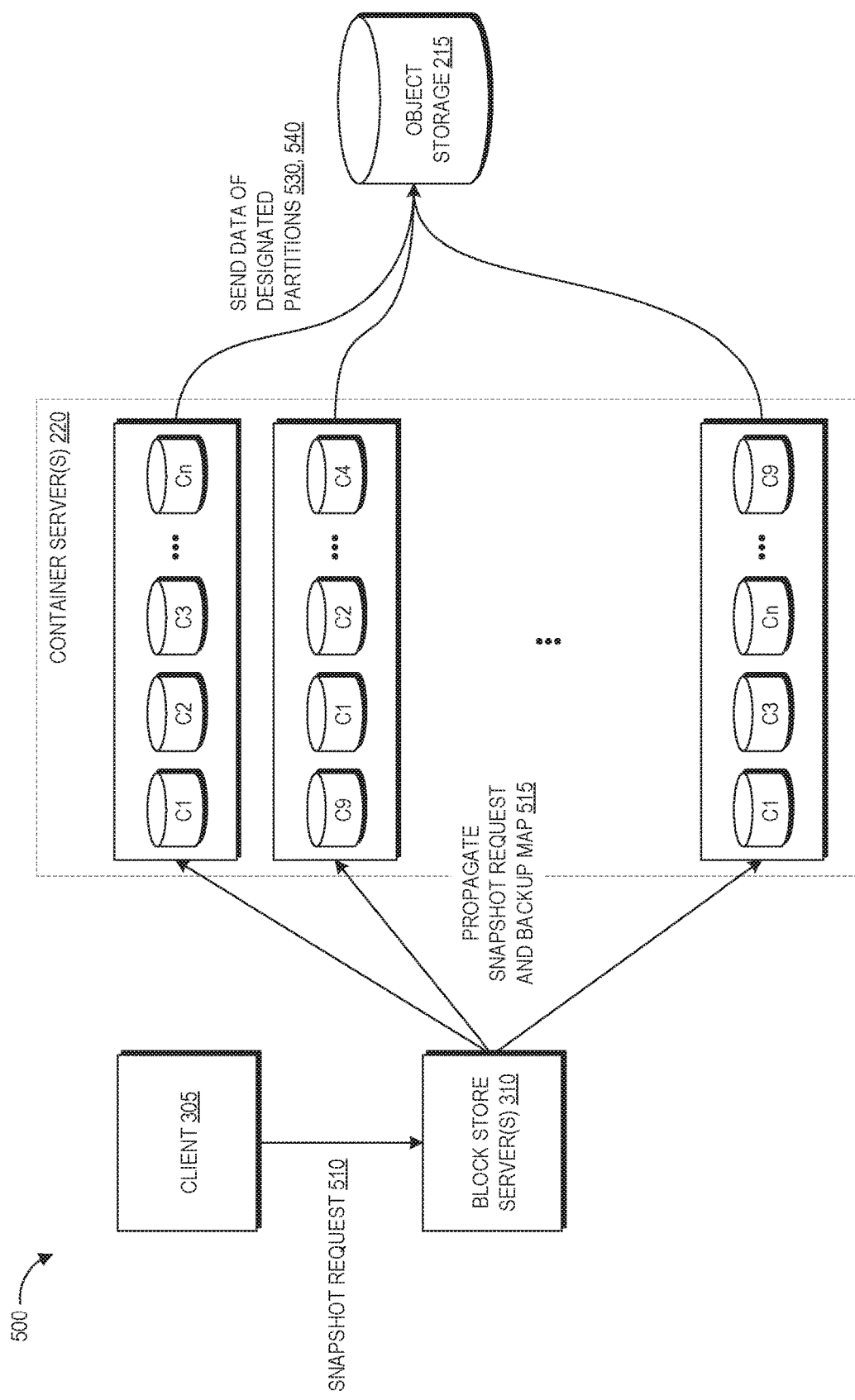
FIG. 5A depicts a schematic diagram of generating a snapshot backup of a volume from a distributed tertiary replica within the elastic computing system of FIG. 1A.

FIG. 5A depicts a schematic diagram of generating a snapshot backup of a volume from a distributed tertiary replica within the elastic computing system 100. As described above, a snapshot is a point-in-time block-level backup of the volume, stored as a copy of data on the volume in the object storage 215 (e.g., as a single object or a collection of objects). In some implementations, snapshots are implemented as incremental records of data within a volume, such that when the first snapshot of a volume is taken, all blocks of the volume that contain valid data are copied as one or more objects to the object storage 215, when subsequent snapshots are taken of the same volume, only the blocks that have changed since the first snapshot need by copied to the object storage 215. When creating a snapshot, any data written to the volume up to the time the snapshot is started can be included in the snapshot, and users can continue to perform I/O operations to their volumes during snapshot creation without affecting the snapshot.

The highly distributed nature the tertiary replica supports a high degree of parallelism where many portions of volume can be transferred simultaneously, supporting rapid creation of backups in object storage 215. As illustrated, a user can make a snapshot request 510 from client 305 to the primary replica (stored on one or more block store servers 310), which in turn sends instructions to the partitions of the tertiary replica stored on the container servers 220 to send data to object storage 215 to create the snapshot backup. As described above with respect to blocks 350 and 355 of FIG. 3B, the snapshot creation process can in some implementations involve the logger fleet 315 that passes along snapshot requests in an update stream to the tertiary replica.

Figure 5B:
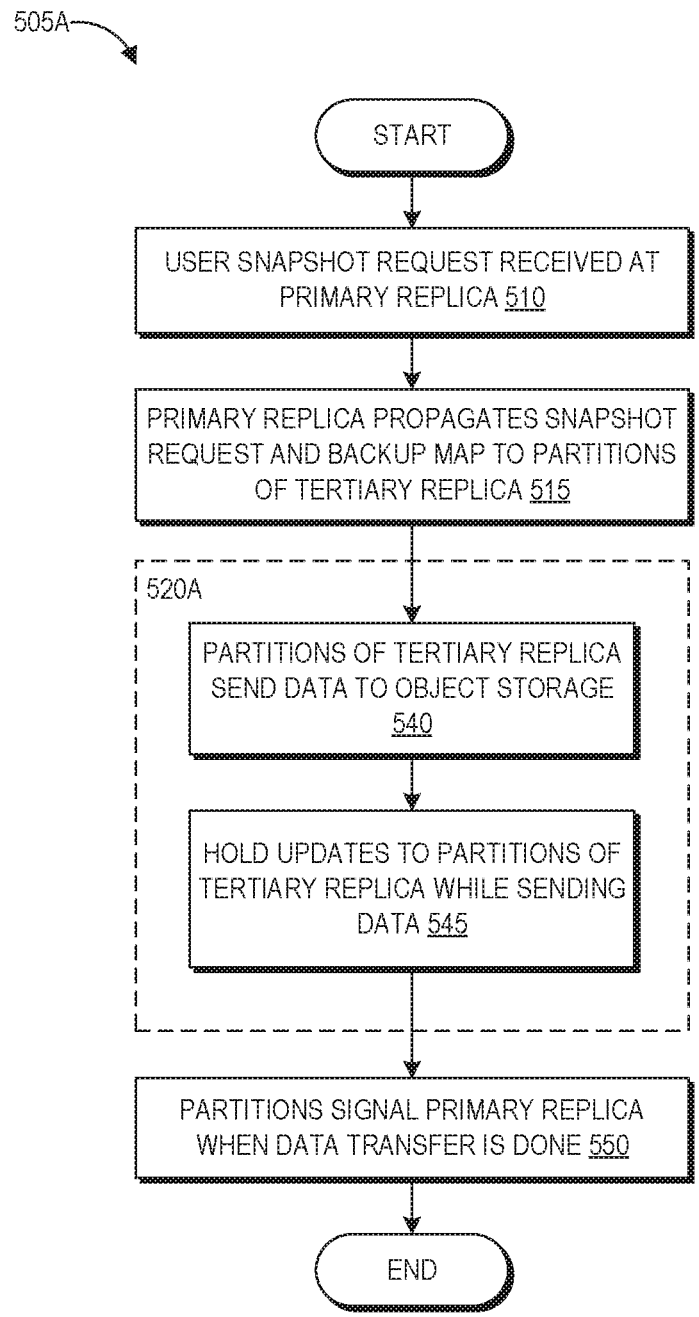
FIG. 5B is a flowchart of an example process for snapshot generation from a distributed tertiary replica according to FIG. 5A.
Figure 5C:
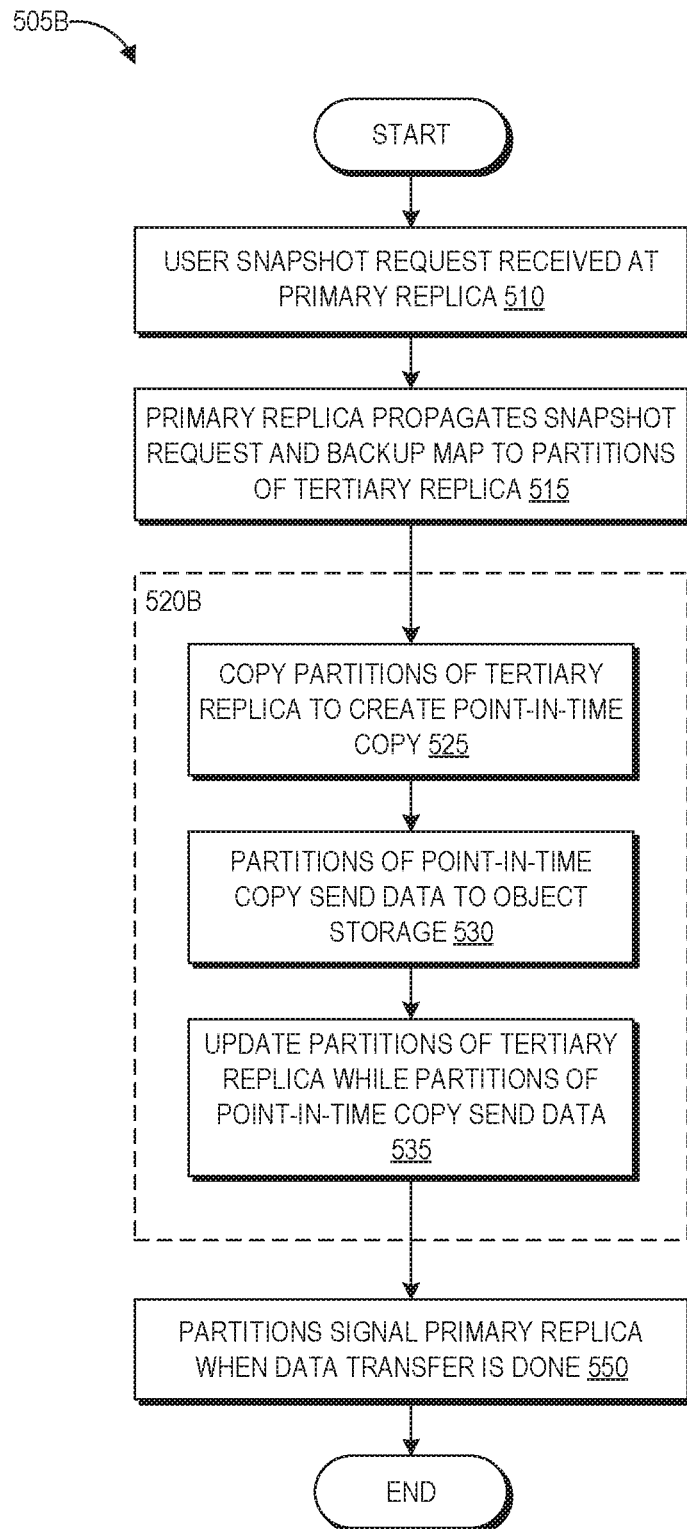
FIG. 5C is a flowchart of another example process for snapshot generation from a distributed tertiary replica according to FIG. 5A.

Further explanation of the interactions of FIG. 5A will be described with reference to FIGS. 5B and 5C. Specifically, FIGS. 5B and 5C are flowcharts of two implementations of example processes 505A, 505B for snapshot generation from a distributed tertiary replica according to FIG. 5A. The common blocks of the processes 505A, 505B are described together below, with the description addressing the different blocks of the processes 505A, 505B individually. The processes 505A, 505B can be performed under control of the control plane 155 of the elastic computing system 120 in some embodiments.

With reference to both FIGS. 5B and 5C, at block 510, the user request to make a snapshot of their volume is received from the client 305 at the block store servers 310 hosting primary replica. As described above, a snapshot is a backup copy of the data of the volume stored on the object storage servers 110, which can provide the benefit of greater fault tolerance compared to copies stored on the block store servers 105 due to the configuration of the object storage servers 110 for automatically replicating data across availability zones. As such, some users request frequent snapshots to keep updated backups of their data in object storage 215, requiring high bandwidth usage for creating such snapshots.

At block 515, the set of block store servers 310 hosting the primary replica propagates the snapshot request to the partitions of the tertiary replica stored on the container servers 220. In some embodiments, the block store servers 310 of the primary replica may offload this task onto block store servers 310 hosting the secondary replica. As described above, in some implementations snapshotting can be an incremental process where only portions of the volume that have received updates since the last backup are sent to object storage. In incremental snapshot implementations, the block store servers 310 that host the primary replica can also maintain a backup map and transmit this backup map with the snapshot request. The backup map refers to a mapping or listing of portions (e.g., blocks, collections of blocks, or the like) of the volume that have been modified since a prior snapshot of the volume (e.g., an immediately preceding snapshot). When a snapshot is created, the block store servers 310 can modify the backup map to reflect that each portion has not been modified since the last snapshot. As a user modifies portions of the volume, one or more of the block store servers 310 hosting the primary replica (or another computing device in the elastic computing system) can modify the backup map to reflect that such blocks have been modified since a prior snapshot. The container servers 220 hosting the tertiary replica partitions can use the backup map to identify any portions that should be sent to the object storage 215 in response to this snapshot request (e.g., portions that have been modified since a prior snapshot).

After the container servers 220 hosting the tertiary replica have received the snapshot request, one of two different implementations of the process can be carried out, as reflected by sub-processes 520A and 520B of FIGS. 5B and 5C. Turning specifically to FIG. 5B, sub-process 520A reflects a first implementation of the process 505A that creates the snapshot directly from the tertiary replica.

With reference specifically to FIG. 5B, at block 540, the container servers 220 send the data of the partitions of the tertiary replica to object storage 215. The container servers 220 can transmit the data of some or all of these partitions in parallel to object storage 215. In FIG. 5A, the object storage 215 is shown as a single object, however the object storage 215 may in fact be represented by a distributed system with multiple physical connections to the container servers 220. Thus, the data of the partitions of the tertiary replica can be sent along a large number of different physical connections. Each data transfer might be a separate HTTP connection, for example. Beneficially, the disclosed tertiary replica architecture provides both high bandwidth of the source side (e.g., the container servers 220) and the destination side (e.g., object storage 215). In addition to greater bandwidth from more physical connections, the disclosed use of the tertiary replica can reduce the memory requirement of parallelization on each container server 220, since each device only has to maintain a small portion of the connections to the object storage 215.

Beneficially, this technique can speed up the time of creating the snapshot relative to transmitting the same data from the more limited number of partitions of the primary and secondary replicas, and it also frees up the data transmission bandwidth of primary and secondary replicas to handle continued user I/O operations. In practice, the use of a highly partitioned tertiary replica to generate a snapshot, as opposed to use of a less partitioned primary or secondary replica, can drastically reduce the time needed to write a snapshot to object storage 215, for example by reducing the time need to write a snapshot from 10 hours (e.g., when writing from a less partitioned replica) to just one hour.

With continued reference to FIG. 5B, if there are continued user I/O operations at the primary replica while the snapshot is being created from the tertiary replica, at block 545 any updates needed to certain partitions of the tertiary replica can be held, for example by a logger fleet 315 or an update slave (e.g., the secondary replica). The updates can be held until the entire snapshot has been completed, or until the partitions designated for such updates have completed transferring their data to object storage 215.

Turning now to FIG. 5C, block 520B reflects a second implementation of the process 505B that creates a point-in-time copy of the tertiary replica (referred to as an "additional tertiary replica"). The additional tertiary replica represents the data of the volume at the time of the snapshot request, while the original tertiary replica can continue to be updated based on writes to the primary replica.

With continued reference to FIG. 5C, at block 525 the container servers 220 copy the partitions of the tertiary replica to create an additional tertiary replica. For example, each partition of the tertiary replica (or a subset that correspond to the blocks in the backup map) can be copied, either into the same container as the original partition or into a different container. These additional tertiary replica partition copies do not receive any further updates based on user I/O operations at the primary replica (at least for the duration of transmitting their data to the snapshot in object storage 215), such that the copy reflects the volume of the data at the time of the snapshot request.

From block 525, the process 505B moves to block 530 at which the partitions of the additional tertiary replica send their data to object storage 215. Some or all of these partitions can transmit their data in parallel to object storage 215, providing similar benefits to those described with respect to block 540 of FIG. 5B.

If there are continued user I/O operations at the primary replica while the snapshot is being created, at block 535 the partitions of the original tertiary replica copy can be updated in response to the user I/O operations. Beneficially, the approach of using an additional tertiary replica to support snapshot creation frees up the original tertiary replica copy to continue receiving updates due to continued user I/O operations, for example as described with respect to FIGS. 3A and 3B, as the partitions of the original tertiary replica copy are not needed for sending volume data to object storage 215 for the snapshot.

From block 535 of FIG. 5C or 545 of FIG. 5B, the processes 505A, 505B transition to block 550 at which the partitions of the tertiary replica (or its copy) signal the primary replica when the data transfer is completed 550. The primary replica can then create an object manifest indicating where in the object storage 215 each block (or some other portion) of the volume is stored. With respect to the object manifest, each container C1-Cn or container server 220 can know where it has placed each object representation of the volume data within the object storage 215. Thus, the server that controls the manifest creation (e.g., the server that controls the primary replica) can gather those locations from the respective container servers and compile them into a data file that maps portions of the volume (e.g., blocks) to objects within the object storage 215.

As described above, the manifest can also reference prior snapshots when incremental snapshotting is used. So, for example, the manifest might indicate the location of blocks 1-433 as identified within a prior manifest, and that prior manifest may reference a still older manifest, etc. Alternatively, the manifest creation device might directly incorporate locations of the object representation of unmodified blocks from a prior manifest into the current manifest such that a single manifest file includes the locations of the portions of the volume data.

Optionally, in some implementations if any additional tertiary replica was created during the process 505, at this point that additional tertiary replica may be deleted. In other implementations that additional tertiary replica may be kept for some period of time, for example to allow the user to create new clones of the volume from it. As such, the process 505 can involve checking for any cloning instructions from the client 505 and/or waiting for such instructions for some predetermined amount of time before deleting the additional tertiary replica.

While the processes 505A, 505B are described with respect to a single snapshot, they may be implemented many times simultaneously or at least partially concurrently, for example where a user requests a snapshot after every write. In such implementations, one iteration of the processes 505A, 505B may be creating a first snapshot while another iteration is creating a second snapshot, and so forth.

Overview of Embodiments Implementing a Logging Fleet

With reference to FIGS. 6-9B, illustrative embodiments of the present disclosure will be described that implement a logger fleet 315. As noted above, the logger fleet 315 may in some embodiments facilitate asynchronous updating of a distributed tertiary replica, such that functions of updating the tertiary replica are offloaded from, for example, devices implementing a primary or secondary replica. The logger fleet 315 may additionally or alternatively provide other functionalities, such as maintaining a record of modifications to a volume as a stream of messages (e.g., where each message reflects a modification to the volume). As will be described below, maintaining a message stream for a volume may provide a number of benefits, such as the ability to revert a volume to any prior state reflected within the message stream (e.g., by "rewinding" the volume to a prior time based on reverting the modifications reflected in the messages of the stream).

Figure 6:
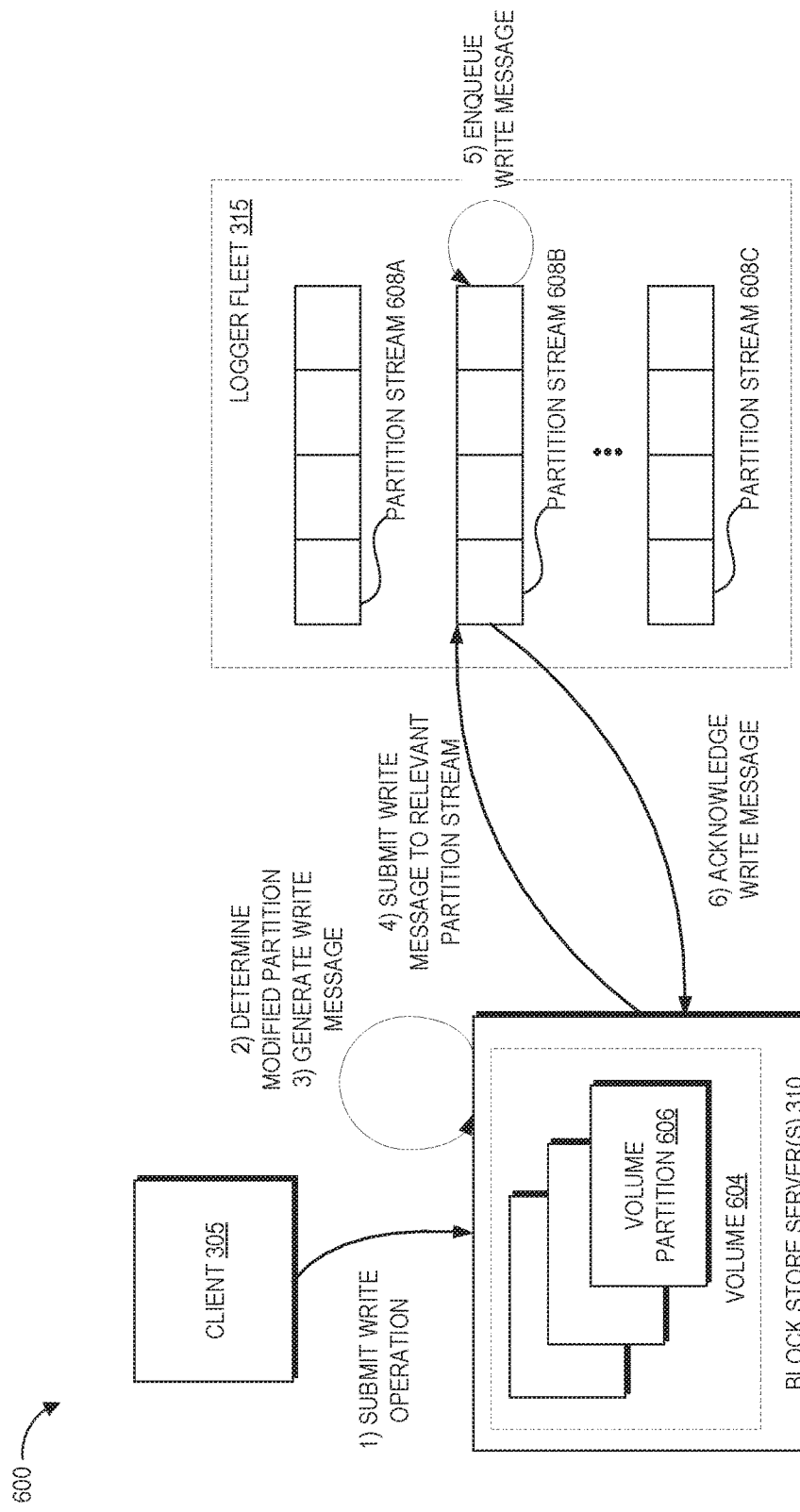
FIG. 6 depicts illustrative interactions for generating a stream of messages from write operations to a distributed storage volume of the elastic computing system of FIG. 1A.

With reference to FIG. 6, illustrative interactions 600 are depicted enabling a logger fleet to maintain a stream of messages reflecting modifications to a volume. The interactions of FIG. 6 begin at (1), where a client 305 submits a write operation to block store servers 310 implementing one or more replicas of a volume (e.g., a primary and/or secondary replica). Because the volume may be presented to the client device 305 as a virtualized storage device (e.g., a hard disk drive or solid state disk drive), the write operation may be transmitted to the block store servers 310 in accordance with any of a number of bus interface protocols, a variety of which are known in the art. For example, the write operation of the client 305 may be formatted as a Serial AT Attachment (SATA) data packet. As noted above, the term "write operation" is intended within the present disclosure to reflect a modification to a target volume, and thus may include operations that write new data, modify existing data, delete data, or otherwise modify the content of a volume as implemented on the servers 310.

After receiving a write operation, the block store servers 310 may utilize the received operation to generate a message corresponding to the write operation for inclusion in a message stream corresponding to the volume. (Note that the block store servers 310 may additionally process to write operation to modify replicas of the volume, such as a primary and/or secondary replica, in accordance with the write operation. As the generic implementation of write operations on a network-based storage device is known in the art, these interactions are not described herein.) In one embodiment, a volume is associated with a single message stream, such that all write operations on the volume are included as messages within the single message stream. In another embodiment, a volume is associated with multiple messages streams, such that write operations on the volume are divided among the message streams. Such division may be based, for example, on a partitioning of a primary replica and/or secondary replica of the volume. Illustratively, if the primary and/or secondary replicas are partitioned into 16 partitions, a logger fleet 315 may be utilized to maintain 16 message streams for the volume, each message stream including messages that reflect write operations pertaining to an individual partition of the 16 partitions. Other divisions of write operations between streams are contemplated. For example, write operations could be divided among different messages streams via a load balancing algorithm (e.g. round robin division, etc.). The division of write operations between multiple message streams may be beneficial, for example, in reducing the memory requirements in maintaining each stream, in enabling parallelization at the logger fleet 315, and reducing the time required to locate a specific write operation within the message streams (e.g., based on knowledge of the partition to which the write operation applied). The following interactions will be illustratively described with reference to the use of multiple message streams to maintain a log of write operations to a volume, each of which corresponds to a partition of a primary and/or secondary replica of the volume. However, similar interactions may be implemented where a single message stream is utilized, or where the message streams are divided according to criteria other than a partition to which the write operation applies (e.g., load balancing division).

Accordingly, at (2), the block store servers 310 determine a partition of the volume (e.g., of a primary and/or secondary replica) that is modified by the write operation. Additionally, at (3), the block store server 310 generates a message reflecting the write operation to be included in an appropriate message stream. The message may include, for example, a record of the content of the write operation (e.g., the SATA data packet representing the write operation), as well as any additional metadata later required or useable to recreate the write operation, such as specific block addresses to which the write operation applies, the time of the write operation, an identity of the client 305 that submitted the write operation, an identifier of the volume to which the write operation applies, a sequence number assigned to the write operation by the block store servers 310, etc. The message may be formatted according to any known messaging protocols. For example, the message may be formatted according to the Message Queuing Telemetry Transport (MQTT) format, formatted for use by a server implementing APACHE KAFKA™ software, or formatted for inclusion in a stream provided by the AMAZON KINESIS™ service.

At (4), the block store servers 310 transmit the message (reflective of a write operation on the volume) to the logger fleet 315 for inclusion in a stream corresponding to the partition of the primary and/or secondary replica to which the write operation applied. As shown in FIG. 6, the logger fleet 315 may maintain a number of partition streams 608A-608N, each of which may correspond, for example, to a different partition of the primary and/or secondary replica. In the illustrative example of FIG. 6, the write message is submitted to partition stream 608B reflecting, e.g., that the write operation modified a second partition of the volume. At (5), the logger fleet 315 enqueues the message into the stream 608B. The logger fleet 315 may in some embodiments implement functionalities to ensure resilience against various failures of the fleet 315, such as by utilizing redundant servers to store messages. In one embodiment, the logger fleet 315 is configured to deliver each message within a queue "exactly once" or "at least once" to each recipient. Illustratively, "exactly once" functionalities may be beneficial in instances where write operations are not idempotent, such that application of the same write operation multiple times does not always result in the same state with respect to the blocks to which the write operation is applied. "At least once" functionalities may be used, for example, where write operations are idempotent (e.g., the same operation applied to the same block always results in the same state of the block, regardless of repetitions of the operation) and may be associated with reduced computing resources at the logger fleet 315. One example implementation for a logger fleet 315 implementing "at least once" functionalities is described within U.S. Pat. No. 8,261,286 entitled "FAST SEQUENTIAL MESSAGE STORE," the entirety of which is hereby incorporated by reference.

As will be described below, the logger fleet 315 can be configured to deliver messages within each stream 608 to various recipients. For example, the logger fleet 315 may deliver messages to a distributed tertiary replica, enabling the tertiary replica to be asynchronously updated to a state of the primary and/or secondary replicas in accordance with the write operations reflected in the messages. As another example, the logger fleet 315 may deliver messages to object storage 215, enabling such object storage 215 to maintain a record of write operations to a volume over time. Illustratively, the logger fleet 315 may enforce ordering of messages, such that messages within a given stream are received at each recipient in a correct order. In one embodiment, the "correct order" is established based on enqueuing of messages at the logger fleet 315 (e.g., such that messages are delivered to recipients in the same order that they are received). In another embodiment, the "correct order" is established based on the content of the message itself. For example, where a message includes metadata indicating a sequence number, the sequence number may be utilized by the logger fleet 315 to establish a correct order of the message in the stream. In some instances, the logger fleet 315 may be configured to synchronize an order of receipt of message with content of the message. For example, the logger fleet 315 may be configured to only accept messages with in-order sequence numbers (e.g., as increasing numbers, decreasing numbers, increasing adjacent numbers, decreasing adjacent numbers, etc.), and to inform a transmitting device if a message is received that includes an out-of-order sequence number.

While the interactions of FIG. 6 are described above with respect to write operations, other operations to a volume may additionally or alternatively be included within a message stream for the volume. For example, "snapshot" operations that request creation of a file reflecting the state of a volume at a given point in time may be reflected within a message of a message stream. Illustratively, a snapshot message may be included in each message stream for a volume, and each device maintaining a partition of a tertiary replica of the volume may be configured, on receipt of a snapshot message, to generate a relevant portion of the snapshot as a file within object storage 215. Creation of a snapshot from a tertiary replica is described in more detail below. In some embodiments, the snapshot message as included within a message stream may indicate a location of the snapshot on object storage 215. As will be described below, this may facilitate a re-creation of a volume state at a point in time, by enabling a device to use the snapshot, as identified within the message stream, in conjunction with write operations identified within the message stream to recreate a state of the volume at the point in time.

Figure 7:
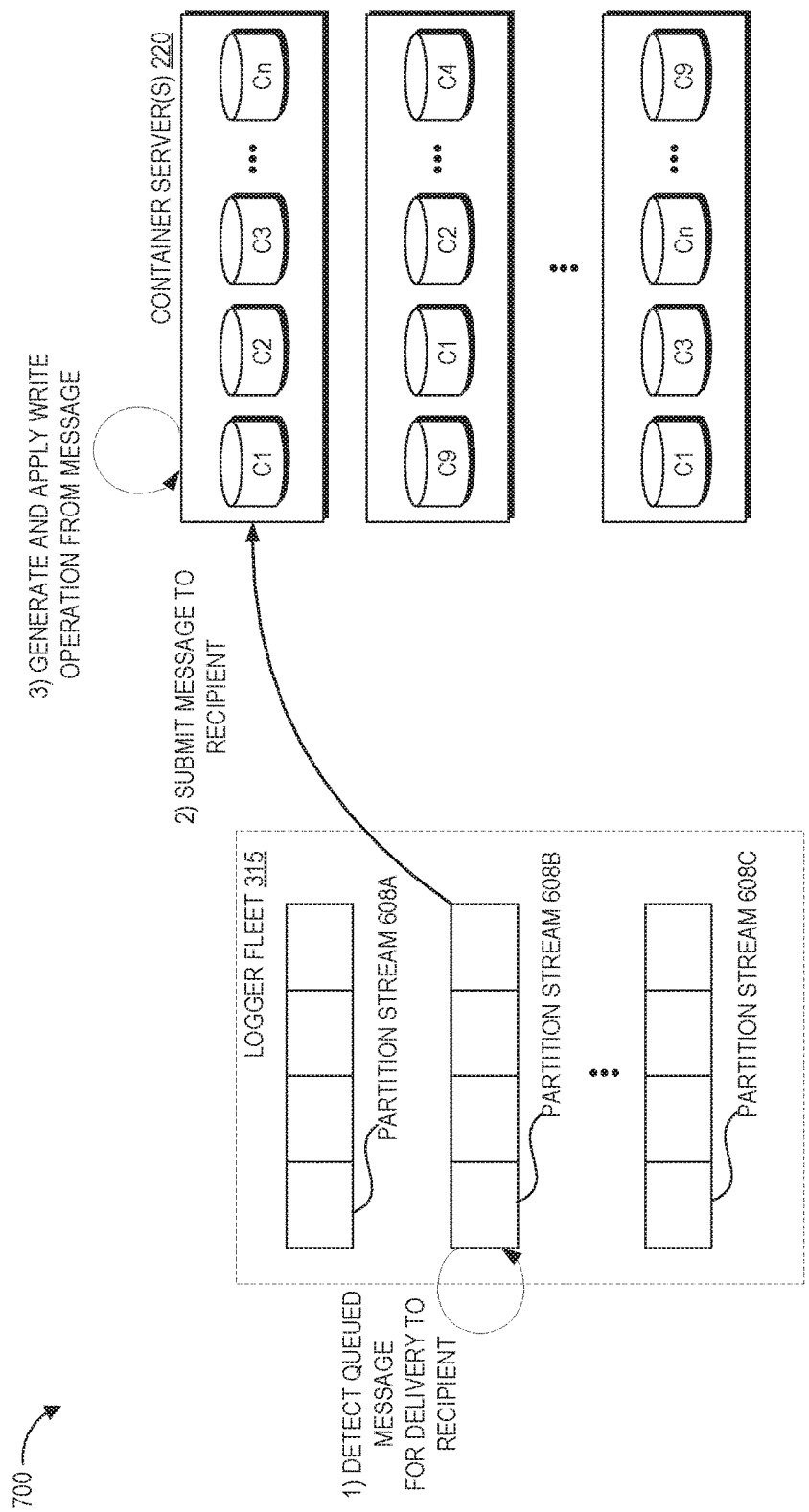
FIG. 7 depicts illustrative interactions for utilizing a stream of messages reflecting write operations to a distributed storage volume to asynchronously update a distributed tertiary replica of the elastic computing system of FIG. 1A.

With reference to FIG. 7, illustrative interactions 700 will be described enabling asynchronous updating of a distributed tertiary replica using messages within a message stream at the logger fleet 315. The interactions of FIG. 7 may occur, for example, subsequent to the interactions of FIG. 6 and/or concurrently with the interactions of FIG. 6 (e.g., where the interactions of FIG. 6 are repeated for multiple write operations).

The interactions of FIG. 7 begin at (1), where the logger fleet 315 detects that a message exists in a message stream that has not yet been delivered to a recipient. Specifically, in the interactions of FIG. 7, the logger fleet 315 can detect that a message exists within the partition stream 608B that has not yet been delivered to a relevant container server 220. The relevant container server 220 can correspond, for example, to a server 220 implementing a partition of a tertiary replica of the volume to which the write operation represented by the message applies. In one embodiment, the logger fleet 315 may maintain, for each stream, a list of recipients for the stream, as well as a list of acknowledgements indicating that a recipient has received a message within the stream. Thus, interaction (1) may be implemented by detecting that a message within the stream 608B has not yet been acknowledged by a recipient of the stream 608B. In one embodiment, the recipient of a stream may be determined based at least in part on the write operation included within the message. For example, where the write operation reflected within a message applies to a specific block offset within the volume, the recipient of the message may be determined based on a server 220 that maintains a partition of a tertiary replica corresponding to that block offset. In some embodiments, the logger fleet 315 is configured to operate according to a publish/subscribe ("pub/sub") model, and each container server 220 is configured to "subscribe" to a relevant portion of a stream 608 of the logger fleet 315, thus informing the logger fleet 315 that the server 220 is a recipient for such a portion of the stream 608. In other embodiments, the logger fleet 315 is notified of which container servers 220 maintain which partitions of a tertiary replica (e.g., by a server 310 implementing a primary and/or secondary replica for the volume) and determines recipients for each message based on such a notification.

After determining that a message exists within the stream for delivery to a recipient, the logger fleet 315, at (2), submits the message to the recipient container server 220. The container server 220 can then, at (3), utilize the message to generate a write operation and to modify a partition of the tertiary replica of the volume in accordance with the write operation. For example, the container server 220 may in some embodiments utilize information within the message to recreate the initial SATA data packet representing the write operation, and to apply that SATA data packet with respect to the relevant partition of the tertiary replica to which the write operation applies. Thus, the tertiary replica of the volume may be asynchronously updated with write operations previously applied to the primary and/or secondary replicas. As noted above, in some instances messages may include other operations than write operations. For example, a message may indicate a client request for a snapshot. In such an instance, the servers 220 may process the message by initiating creation of a snapshot for the volume, as described above (e.g., with respect to FIGS. 5A through 5C).

While FIG. 7 depicts a transmission of a single message to a single recipient, the logger fleet 315 may function to facilitate delivery of any number of messages to any number of recipients. In one embodiment, the logger fleet 315 transmits messages to each recipient (e.g., as identified by subscriptions to a stream) in sequential order with respect to that stream, such that messages are transmitted in a "first in first out" (FIFO) order with respect to the order that they are enqueued into the stream. The use of FIFO order can, for example, maintain consistency of the tertiary replica with the primary and/or secondary replicas.

In some embodiments, the logger fleet 315 may be enabled to monitor a size of each partition stream 608 to ensure that outstanding messages (e.g., those unacknowledged by each recipient) does not exceed a threshold amount. Illustratively, the logger fleet 315 May enqueue messages as they are received, and mark as acknowledged messages as they are acknowledged by each recipient of the message. However, in the instance that a recipient fails to acknowledge messages (e.g., due to an error, hardware failure, etc.), the number of unacknowledged messages in a queue may exceed a threshold size. On such occasion, the logger fleet 315 may be configured to notify the block store servers 310 of such a failure, such as by rejecting subsequent requests to write a message to the stream. The block store servers 310, in turn, may reject write operations from a client device 305 or otherwise indicate that such write operations are not being written to a tertiary replica of a volume.

With reference to FIG. 8, illustrative interactions 800 for writing a record of messages within a message stream to object storage 215 will be described. Such a record of messages may be utilized, for example, to recreate the state of a volume at any point in time reflected within a message stream for the volume. The illustrative interactions of FIG. 8 will be described with respect to a single message stream, partition stream 608B. However, similar interactions may be implemented with respect to any message stream for a volume.

The interactions of FIG. 8 begin at (1), where the logger fleet 315 detects a queue collection event. The queue collection event illustratively corresponds to any event indicating that events within a message stream (e.g., the stream 608B) should be dequeued and transmitted to the object storage 215 (e.g., for long term storage). In one embodiment, a queue collection event corresponds to the number of messages within a stream growing above a threshold number (e.g., set by an administrator of the logger fleet 315). In another embodiment, a queue collection event corresponds to detection of a snapshot operation within a message of the stream. In yet another embodiment, a queue collection event corresponds to elapsing of a threshold period of time since a prior queue collection event (e.g., 24 hours).

On detection of a queue collection event, the logger fleet 315, at (2), bundles, collects, or otherwise compiles the messages within the stream 608B into a data object to be written to the object storage 215, which data object is referred to herein as a "bundle object." A bundle object may be any data object identifying the messages within the stream at the time of generation of the bundle object. For example, the bundle object may be a ZIP or other compressed data file. In one embodiment, the logger fleet 315 includes within a bundle object only messages acknowledged by all recipients (e.g., container servers 220). The logger fleet 315 then, at (3), stores the bundle object within the object storage 215. As will be described below, the bundle object may later be retrieved from the object storage 215 as a record of write operations conducted to a volume over a period of time reflected by the messages within the bundle object. Because the messages have been stored at the object storage 215, the logger fleet 315 may thereafter dequeue the messages of the bundle object from the partition stream 608B at (4), freeing space within the stream for subsequent messages.

While dequeuing of messages from the partition stream 608B is described above as a periodic operation (e.g., as queue collection events are received), some embodiments of logger fleet 315 may alternatively dequeue messages as they are acknowledged by all recipients. Illustratively, object storage 215 may enable writing of individual messages to an object or collection of objects, and object storage 215 may be configured as a recipient of each message stream for a volume. Thus, the logger fleet 315 may be configured to transmit messages to the object storage 215 in the same or similar manner to as to other recipients (e.g., container servers 220). In such an instance, messages may be dequeued from a message stream after acknowledgement of receipt from all recipients including the object storage 215.

Figure 9A:
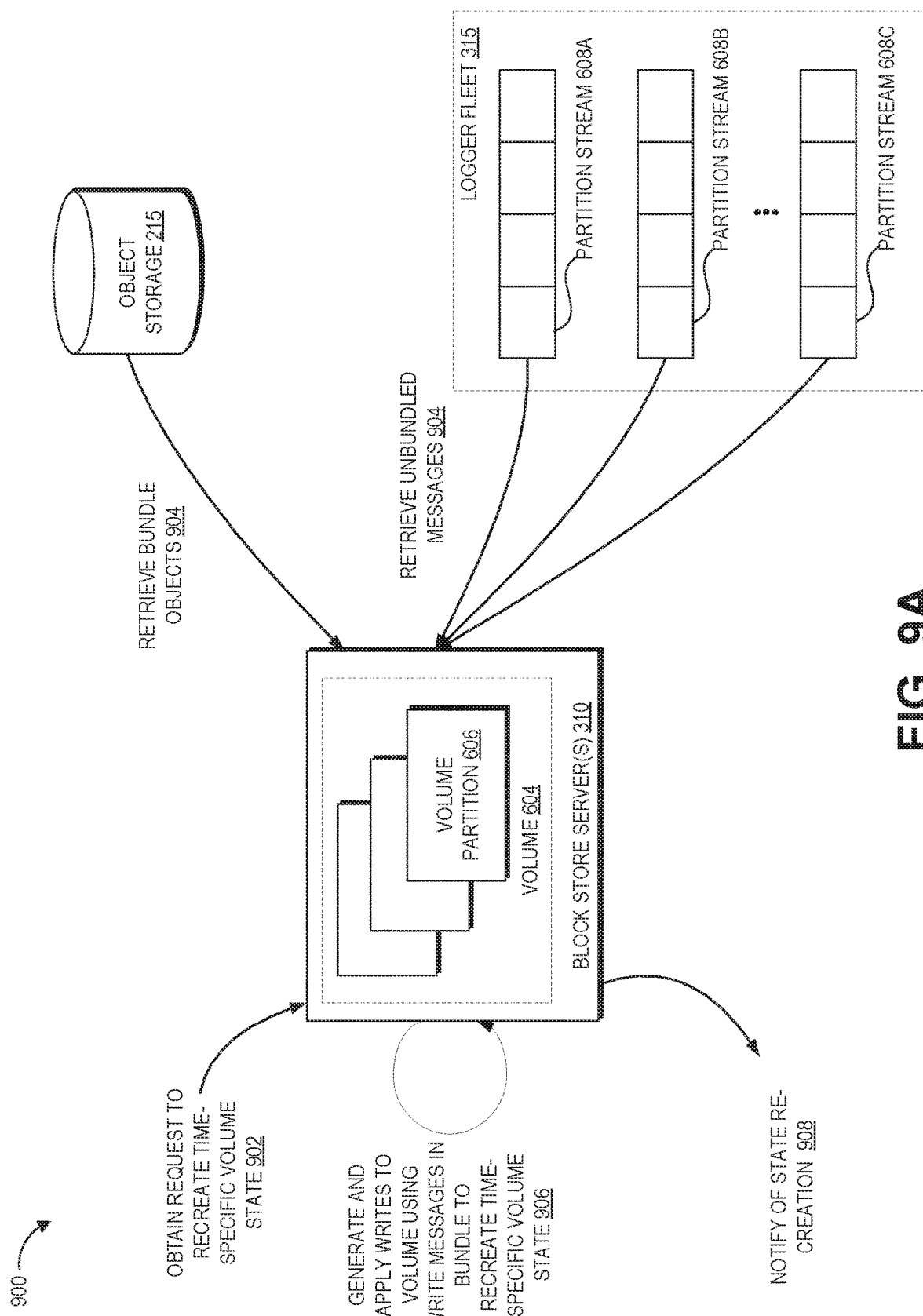
FIG. 9A depicts a schematic diagram of replicating the state of a volume of the elastic computing system of FIG. 1A at a specific point in time based on a stream of messages reflecting writes to the volume.
Figure 9B:
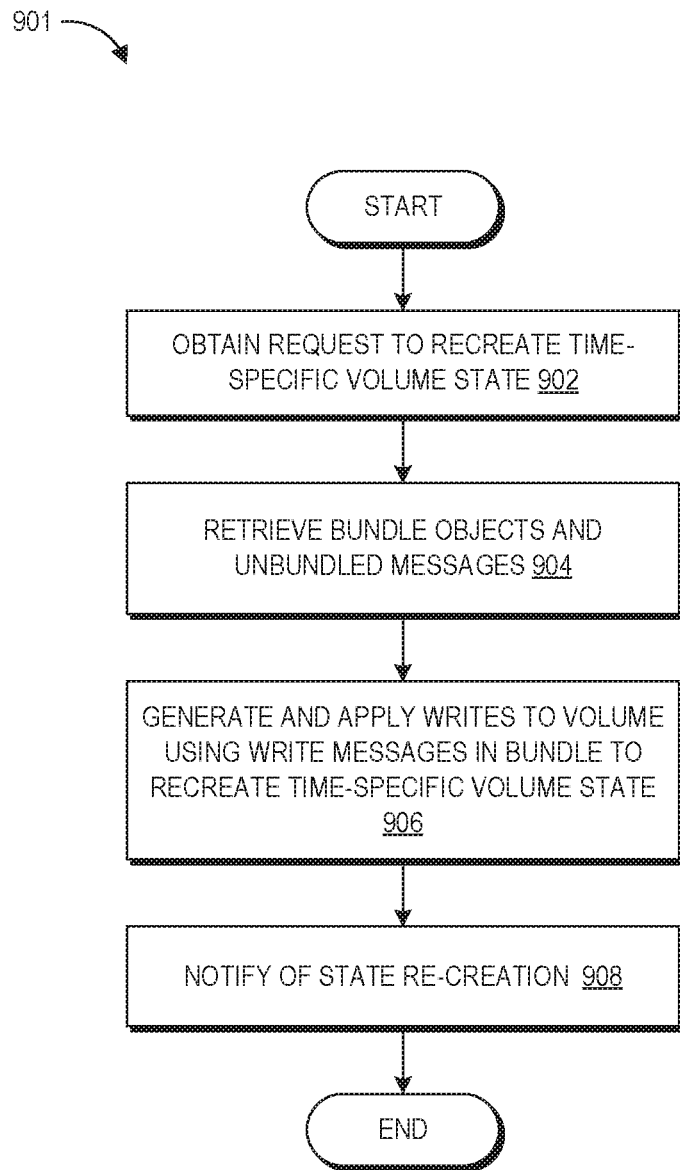
FIG. 9B is a flowchart of an example process for replicating the state of a volume according to FIG. 9A.

With reference to FIGS. 9A and 9B, illustrative interactions will be described for recreating the state of a volume at a point in time by reference to a stream of messages (or log of such stream) reflecting write operations on the volume. Specifically, as discussed above, where modifications to a volume are reflected within a stream of messages for the volume, such a stream of messages may be used to recreate a state of the volume at any time reflected within the stream of messages. Illustrative interactions 900 for recreating the state of a volume at a particular point in time are depicted within FIG. 9A, while an illustrative routine 901 for recreating the state of a volume at a particular point in time are depicted within FIG. 9A. The routine 901 may be carried out, for example, by a device maintaining a first volume in which the state of a second volume is to be recreated. The first and second volumes may be the same volume, thus enabling a client to "rewind" operations on a volume to place that volume in its prior state. The first and second volumes may be different volumes, thus enabling a client to recreate, in a new volume, a prior state of a previously existing volume. In FIG. 9A, the routine 901 is illustrated as implemented by a block store server 310 to recreate the state of a previously existing volume as a new volume, the new volume including for example a primary and secondary replica implemented at the block store server 310. The routine 901 may additionally or alternatively be implemented by container servers 220 to recreate the state of a previously existing volume as a new highly distributed volume or replica.

With reference to FIGS. 9A and 9B, at block 902, the block store servers 310 obtain a request to recreate the state of a previously existing volume at a specific point in time. The request may, for example, be generated by a client 305, and may specify the previously existing volume, the specific point in time, and a target volume in which to recreate the state of the previously existing volume at the specific point in time (which target volume may be the same as the previously existing volume or a different volume).

In another embodiment, the request may be generated by the logger fleet 315 or a device implementing a control plane 155 of the elastic computing system 120. Illustratively, the interactions described with reference to FIGS. 9A and 9B may be utilized to convert a stream of messages reflecting write operations to a volume over a period of time into a snapshot of the volume at a specific point in time. Because such a snapshot may require less memory to store than the stream of messages, these interactions may enable the elastic compute system 120 to reduce memory usage of the system 120. Illustratively, where a stream of messages for a volume exceeds a threshold size, the system 120 may be configured to determine the earliest messages within the stream that cause the stream to exceed the threshold size, and to create a snapshot for the volume reflecting the state of the volume after implementation of write operations reflected in those earliest messages. Thereafter, the system 120 may delete those earliest messages, as the state of the system just after the messages is retained within the snapshot.

At block 904, the block store servers 310 retrieves messages that reflect write operations to the volume between a reference point in time and the specific point in time associated with the request. The reference point in time may illustratively be any point prior to the specific point in time and at which a state of the entire volume was known. The reference point in time may, for example, correspond to an initial creation of the volume or a creation of a snapshot of the volume. Thus, the retrieved messages can be utilized to begin from the state of the volume at the reference point in time, and to apply the write operations included within the message to re-create a state of the volume at the specific point in time. Illustratively, the block store server 310 may maintain a record of reference points in time for a volume, and may select the reference point in time to be used for a specific implementation of routine 901 as a first reference point in time preceding the specific point in time associated with the request.

The messages retrieved in block 904 may include either or both bundle objects included messages, as stored within the object storage 215, or unbundled messages as stored within the logger fleet 315. Illustratively, each message or bundle object may be associated with a volume identifier and a time or time range for the write operation reflected in the message. Thus, the block server 310 may request from the object storage 215 and/or the logger fleet 315 messages associated with a period between the reference point in time and the specific point in time of the request.

At block 906, the block store server 310 applies to the target volume 604 a set of write operations generated from the retrieved messages, in order to cause the target volume 604 to re-create the state of the previously existing volume specified in the request at the specific point in time specified in the request. In one embodiment, the block store server 310 initially causes a state of the volume 604 to match the state at the reference point in time (e.g., by setting all blocks to unwritten where the reference point in time is initial creation of a volume, by setting all blocks to values as reflected in a snapshot when the reference point in time corresponds to creation of the snapshot, etc.). Thereafter, the block store server 310 may apply write operations to the volume in an ordering matching that of the retrieved messages, thus recreating modifications made to the previously existing volume, and causing the target volume 310 to match the state of the previously existing volume at the specific point in time.

In another embodiment, the block store server 310 may apply write operations to the volume in an ordering that is the inverse of the ordering of the retrieved messages, e.g., a reverse-chronological order, by first applying a write operation corresponding to a last message, and then sequentially applying write operations of earlier messages. When applying write operations in a reverse order, the block store servers 310 may ignore second and subsequent writes to the same block of the previously existing volume, thus establish a last write (as reflected in the timing of the messages) as the state for the block as a state of the block in the target volume. In some instances, applying write operations in a reverse order may enable the block store server 310 to operate without pre-establishing a reference point in time. For example, the block store server 310 may be configured to begin retrieving the latest messages for a volume from the logger fleet 315 or object storage 215, and to continue retrieving messages and applying corresponding write operations to a target volume in a reverse order of the messages (e.g., ignoring second or subsequent writes to the same block) until all blocks of the target volume 604 have a known state. Illustratively, the block store server 310 may determine that all blocks of the target volume 604 have a known state by determining that a reference point in time has been reached in the reverse-chronological retrieval of messages, or that all blocks have been written to within such messages.

Thereafter, at block 908, the block store server 310 notify a recipient that the target volume 604 has been placed in a state of the previously existing volume at the specific point in time. The recipient may, for example, correspond to a client who initially requested recreation of the state of the previously existing volume. Additionally or alternatively, where the recreation of the volume was requested by the system 120, the recipient may be a control plane 155 of the system. In such an instance, the control plan 155 may thereafter cause creation of a snapshot of the target volume 604 to be stored within the object storage 215, thus enabling deletion of messages used to create the state of the target volume 604.

The application of write operations at block 906 may occur sequentially with reflect to a given block, such that a latest message reflecting a write operation to the block prior to or at the specific point in time is considered authoritative of the state of the block that the specific point in time. However, the application of write operations at block 906 may also occur in parallel with respect to different blocks or portions of blocks. Illustratively, the block store servers 310 may be configured to implement a number of instances of block 906, or in some instances the entirety of the routine 901, in parallel. For example, an individual implementation of block 906 or the routine 901 may occur for each partition of a target volume 906. Such parallelization may enable the block store servers 310 to rapidly place the target volume 906 in a state matching that of the previously existing volume at the specified point in time.

While illustrative functionalities of a logger fleet 315 are discussed above, additional functionalities may additionally or alternatively be implemented by the logger fleet 315. Illustratively, the logger fleet 315 may be configured to provide a publically accessible API through which authorized clients are enabled to subscribe to message streams associated with a data volume (e.g., a volume which they are authorized to access). Thus, a client may utilize such an API to implement various functionalities, such as notifications regarding modifications to a data volume. For example, a client device may be configured to subscribe to a message stream from a data volume, determine when modifications satisfying a set of criteria are included within the message stream, and to notify an end user of such a modification. Thus, the functionalities described herein are illustrative in nature.

Overview of Embodiments Utilizing Intermediary Duplicates

As noted above, while a highly distributed tertiary replica can facilitate rapid duplication of a volume, there may be instances in which a level of requested duplication would nevertheless require excessive time under use of a single highly distributed replica. For example, where a user wishes to duplicate a source volume, or portion of that volume (e.g., a boot sector) hundreds or thousands of times, such duplication may require large amounts of time when using a singly highly distributed tertiary replica. As such, embodiments of the present disclosure can enable creation of intermediary duplicate replicas, or intermediary duplication partitions of a replica, to allow for more rapid mass duplication. In one embodiment, a request for mass duplication of a volume (or a portion of the volume) can be facilitated by first creating one or more intermediary duplicate replicas or intermediary duplication partitions (either of which may be referred to herein as an "intermediary duplicate"), and then using such intermediary duplicates to facilitate the mass duplication of the volume to one or more target volumes.

Figure 10A:
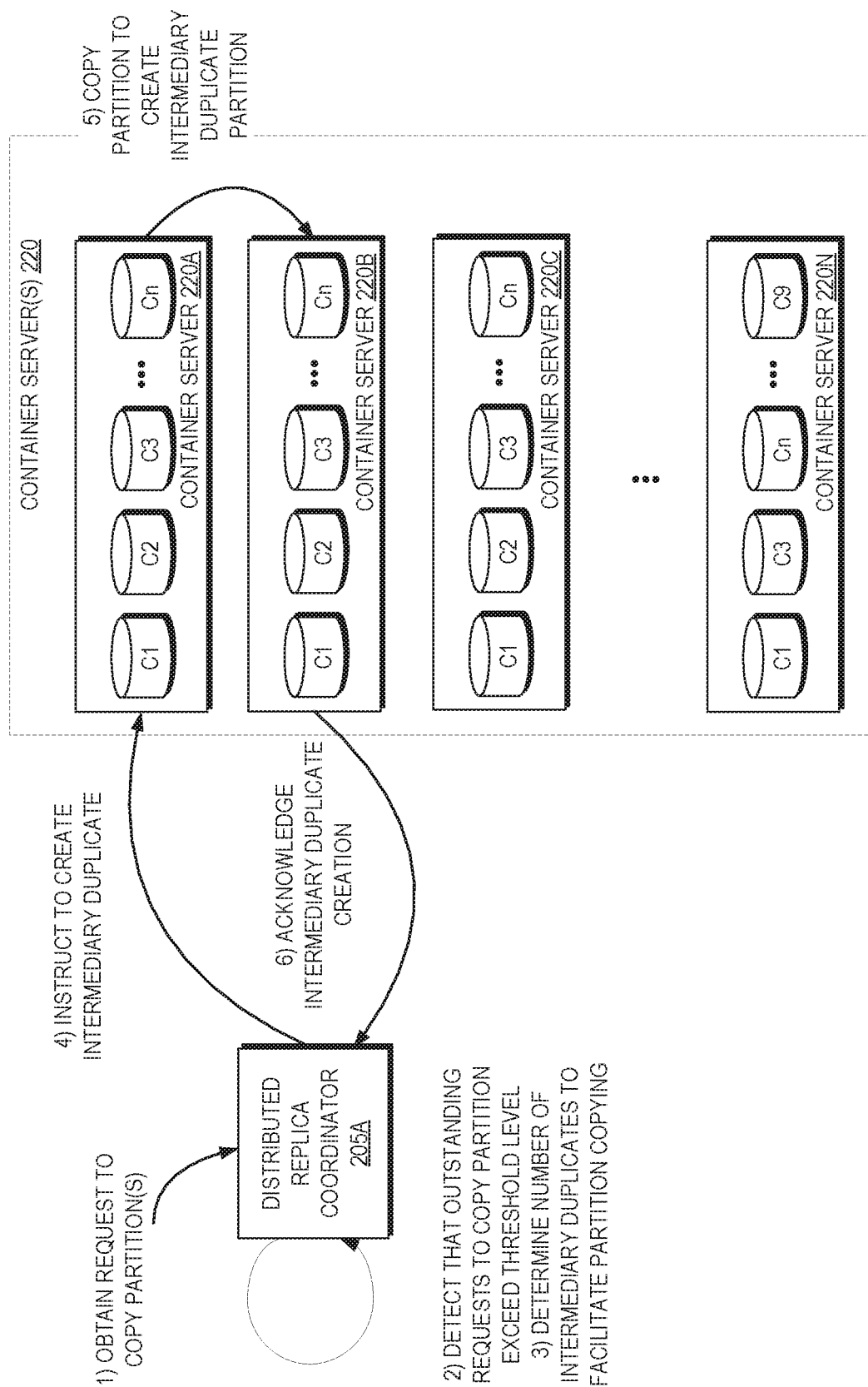
Figure 10B:
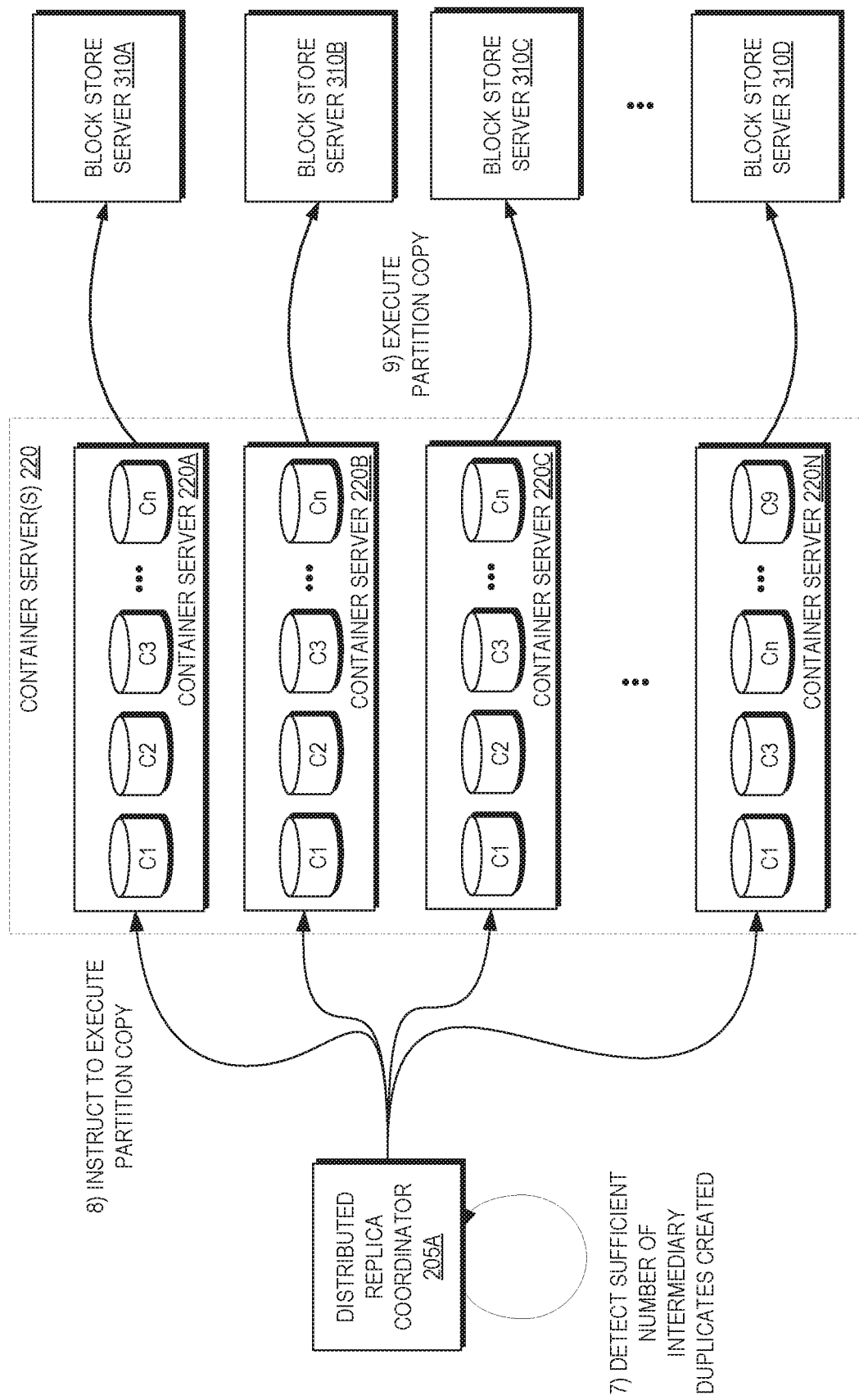

The creation of one or more intermediary duplicates can be facilitated by a centralized authority, such as a distributed replica coordinator 205 of FIG. 2A, or can be facilitated by servers hosting partitions of an initial highly distributed replica (e.g., container servers 220 of FIG. 2A). Illustrative interactions for implementation and use of intermediary duplicates will be described below with respect to FIG. 10A-11C. Specifically, the interactions of FIGS. 10A-10C depict interactions for use of a distributed replica coordinator 205 acting as a centralized authority to manage creation and use of intermediary duplicates to facilitate mass copying of information from a volume. The interactions of FIGS. 11A-11C also depict interactions to manage creation and use of intermediary duplicates facilitating mass copying of information from a volume, but do so utilizing peer-to-peer operation of container servers 220, rather than requiring a centralized authority. The interactions of FIGS. 10A-11C are illustratively described with reference to a single partition, of a highly distributed replica corresponding to source volume, being duplicated to a number of target volumes. This single partition may include, for example, a configuration file or other information requested to be copied to a large number of target volumes. However, similar interactions could be utilized to facilitate duplication of information from multiple partitions of a highly distributed replica or all partitions of the replica (e.g., the entire data volume). Illustratively, by implementing the interactions of FIGS. 10A-10C or 11A-11C with respect to all partitions of a highly distributed replica, an entire source volume represented by the highly distributed replica can be rapidly duplicated to even a large number of target volumes. Moreover, while the interactions of FIGS. 10A-11C are described with respect to duplication of a volume (or portion thereof) to a set of target volumes, similar interactions may be used to facilitate duplication of a volume (or portion thereof) to any network device. For example, intermediary duplicates may be utilized to facilitate mass duplication of a source volume (or portion thereof) to one or more objects within the object storage servers 110 (e.g., creating hundreds or thousands of point-in-time "snapshots" of the source volume) or to one or more network destinations external to the elastic computing system 120.

As stated above, the interactions of FIGS. 10A-10C depict interactions for use of a distributed replica coordinator 205 acting as a centralized authority to manage creation and use of intermediary duplicates to facilitate mass copying of information from a single partition of a highly distributed replica of a source volume. The partition of the highly distributed replica is illustratively stored within a first container server 220A of a set of container servers 220 available to host such partitions.

The interactions of FIGS. 10A-10C being at (1), where the distributed replica coordinator receives a request to copy a partition of a highly distributed replica of a source volume to a set of target volumes. In one embodiment, the request is submitted by a user through an API provided by the block store servers 105. The API may facilitate submission of the request directly to the distributed replica coordinator 205A, or submission to another device (e.g., implementing a control plane 155) which in turn submits the request to the distributed replica coordinator 205A. The request may identify, for example, the information of the source volume to be copied and a set of target volumes to which the information should be copied. The information may be specified, for example, as a partition of a highly distributed replica for the source volume, or as one or more files of a source volume which the coordinator 205A can map to the partition (e.g., based on the block range of the source volume in which the information is stored). The set of target volumes may be specified, for example, as target volumes on the block store servers 105, as instances 116 on compute servers 115, or a combination thereof. Where duplication to object storage servers 110 or external network devices is desired, the set of targets may be specified as locations at the object storage servers 110 or external network devices.

At (2), the distributed replica coordinator 205A determines a number of outstanding requests to duplicate the partition exceeds a threshold level. In one embodiment, the threshold level can be preestablished as a set value, such as by an administrator of the compute system 110 or by a user of the source volume. In another embodiment, the threshold level may be a threshold time expected to be required to complete all outstanding request to duplicate a partition. For example, the coordinator 205A may determine (e.g., based on historical information regarding time to complete requests to duplicate a partition) an expected time required to quiesce a queue of outstanding request to duplicate a partition, and determine that the number of outstanding requests to duplicate the partition exceeds a threshold level when the expected time required to quiesce the queue exceeds a threshold time (e.g., as set by an administrator of the compute system 110 or by a user of the source volume).

After determining that number of outstanding requests to duplicate the partition exceeds a threshold level, the coordinator, at (3), determines a number of intermediary duplicate partitions that should be created to facilitate duplication of the source partition. In one embodiment, the number of intermediary partitions is based at least partly on the number of outstanding requests to duplicate the partition. Illustratively, the number of intermediary partitions may be determined by the coordinator 205A such that a combination of the intermediary duplicate partitions and the source partition can facilitate satisfaction of the outstanding requests to duplicate in under a threshold time. In another instance, an administrator or user may designate a desired number of outstanding requests per source partition or intermediary duplicate partition. For example, where the desired number of outstanding requests per partition is 20, the number of intermediary duplicates may be calculated by dividing the outstanding requests by 20 and subtracting one (to account for the initial source partition). In some instances, a maximum number of intermediary duplicate partitions can be established, such that the determined number does not exceed the maximum. This may limit, for example, the total resources of the compute system 110 used to facilitate mass duplication of a partition (e.g., where mass duplication is represented by an outstanding number of requests to duplicate a partition over the threshold level).

At (4), the distributed replica coordinator 205A submits instructions to a container server 220 hosting the initial partition of the highly distributed replica (depicted as container server 220A in FIG. 10A) to copy the initial partition to a second container server (depicted as container server 220B in FIG. 10B), thus creating an intermediary duplicate replica on the second container server. In one embodiment, the instructions specify the second container server. In another embodiment, the second container server is selected by the container server hosting the initial partition (e.g., by random selection). At (5), the container server 220A copies the initial partition to the container server 220B, thus creating an intermediary duplicate partition on the container server 220B. At (6), the container server 220B transmits to the coordinator 205A an acknowledgement that the intermediary duplicate partition has been created on the container server 220B.

Thereafter, interactions (4)-(6) may be repeated in serial, parallel, or a combination thereof, until the number of intermediary duplicate partitions matches the number determined by the coordinator 205A at (3). For example, after receiving acknowledgement of creation of an intermediary duplicate on container server 220B, the coordinator 205 may repeat interaction (4) twice (potentially simultaneously or concurrently), once instructing container server 220A to create an intermediary duplicate on container server 220C and once instructing container server 220B to create an intermediary duplicate on container server 220N. At each repetition of interactions (4)-(6), the number of sources for the information of the initial partition can grow, thus facilitating creation of more intermediary duplicates, which in turn represent additional sources of the information of the initial partition. In this manner, repetition of interaction (4)-(6) can facilitate exponential increases in the number of intermediary duplicates of a source partition.

After a sufficient number of intermediary duplicates has been created (e.g., satisfying the number as determined at (3)), the interactions of FIG. 10A can be continued as depicted in FIG. 10B. Specifically, the coordinator 205A, at (7), detects that a sufficient number of intermediary duplicates has been created, and at (8), instructs the servers 220 hosting the initial partition and the intermediary duplicates to execute copying of the information of the partition (as represented by the initial partition and the intermediary duplicate partitions) to target volumes. In the interactions of FIG. 10B, it is assumed that the information of the partition has been duplicated among each of the container servers 220N. However, duplication is also possible among less than all of the container servers 220N. Furthermore, in the interactions of the target volumes are assumed for illustrative purposes to be volumes on the block store servers 110C. Thus, at (9), each container server 220 executes a partition copy operation, copying the information of the source partition to a destination block store server 310. Because these operations can be carried out in parallel, the information of the source partition can be copied to the block store servers 310 rapidly, as compared to executing the partition copy operation in serial from an initial partition on a container server 220A.

While FIG. 10B depicts a single parallelization of a partition copy operation, these interactions may be repeated to facilitate copying of the information of the source partition to any number of block store servers 310 or other network devices. Illustratively, the coordinator 205A may implement a workflow control algorithm to send to individual container servers 220 instructions to carry out an outstanding request to duplicate the source partition to a target volume. As each partition copy operation completes, a container server 220 may report such completion to the coordinator 205A, who may send to the container server 220 instructions to carry out another outstanding request to duplicate the source partition (if any exist). These interactions may repeat until no further outstanding requests to duplicate the source partition exist, or until the number of outstanding requests falls below a threshold level indicating that excess intermediary duplicates should be removed through a garbage collection process, as will be described with respect to FIG. 10C. In some instances, each container server 220 may be configured to handle multiple outstanding requests, and as such, the coordinator 205A may submit to each container server 220 instructions to execute multiple partition copy operations.

As noted above, FIG. 10C depicts illustrative interactions for implementing "garbage collection" with respect to intermediary duplicates, such that excess intermediary duplicates can be removed from the container servers 220, reducing computing resources required at the container servers 220. Specifically, the interactions of FIG. 10C begin at (10), where the distributed replica coordinator 205A detects that a number of outstanding partition copy requests has fallen below a threshold level. In one embodiment, the threshold level may be set as a per-partition value, such that the threshold is met when a total number of outstanding copy requests divided total number of source partitions (e.g., including the initial partition and any intermediary duplicates of the partition) falls below the threshold value. For example, a threshold of 20 requests-per-partition may be met when less than 100 requests exist for a partition duplicated 5 times on the container servers 220. In another embodiment, the threshold level may be specified as a threshold time required to satisfy outstanding partition copy request. For example, if the current number of duplicate partitions for information on the container servers 220 is expected to satisfy all outstanding requests in less than 30 seconds, the threshold level may be satisfied.

After detecting that the outstanding requests to copy a partition fall below a threshold level, the distributed replica coordinator 205A, at (12), transmits instructions to the container servers 220 to delete unneeded intermediary duplicates. In one embodiment, the distributed replica coordinator 205A may select a single container server 220 hosting an intermediary duplicate (e.g., at random), and transmit instructions to the container server 220 to delete its hosted intermediary duplicate. Thereafter, interactions (11) and (12) may be repeated until the outstanding partition copy requests no longer fall below the threshold level. In another embodiment, the distributed replica coordinator 205A may determine a number of intermediary duplicates to be deleted such that the outstanding partition copy requests no longer fall below the threshold level, and, at (12), may transmit instructions to container servers 220 hosting that number of intermediary duplicates. In this way, the coordinator 205A can ensure that excess intermediary duplicates are not maintained within the container server 220, making resources of the container servers 220 available for other operations (e.g., the duplication of other partitions, other volumes, etc.).

While embodiments discussed above relate to deletion of an intermediary duplicate based on outstanding partition copy requests, additional or alternative metrics may be used to determine whether to delete an intermediary duplicate. For example, a distributed replica coordinator 205A may obtain or determine a historical usage of copy requests for the initial partition, and from such historical usage, predict future copy requests for the partition (e.g., by projecting historical usage into a future time). Thereafter, the distributed replica coordinator 205A may function to delete one or more intermediary duplicates only when the predicted future copy requests for the partition (e.g., over a future period of time) fall below a threshold level. In one embodiment, the future period of time may be set at least partly based on a time required by the container servers 220 to delete and regenerate an intermediary duplicate partition. Thus, for example, if future partition copy requests are predicted to be sufficient to warrant use of an intermediary duplicate partition in less time than is needed to delete and regenerate the intermediary duplicate partition, the distributed replica coordinator 205A may determine that the intermediary duplicate partition should not be deleted.

Figure 11A:
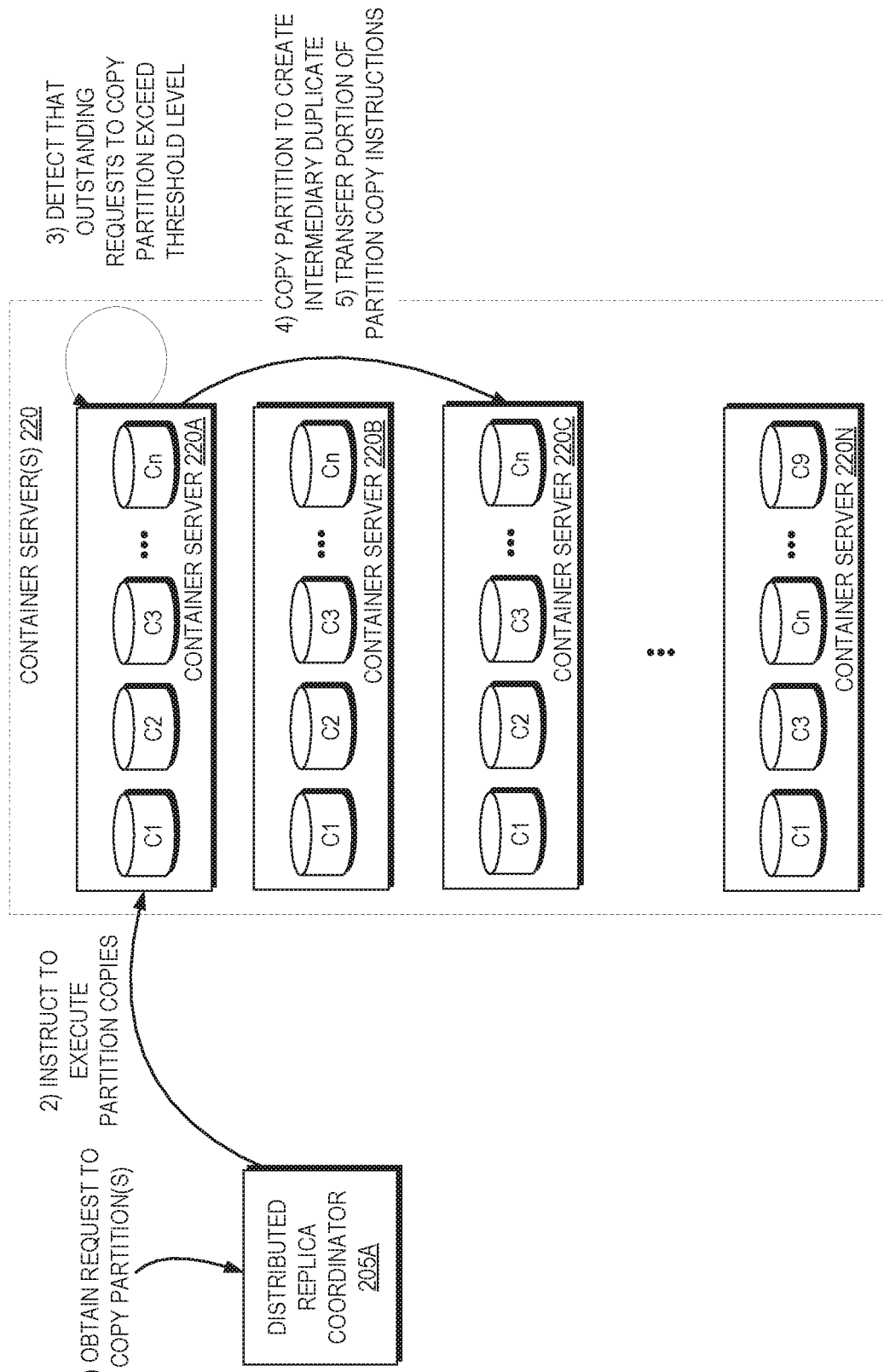
FIGS. 11A-11C depict illustrative interactions for facilitating mass duplication of a volume or portion of a volume by use of peer-to-peer communications to create intermediary duplicate partitions for the volume.
Figure 11B:
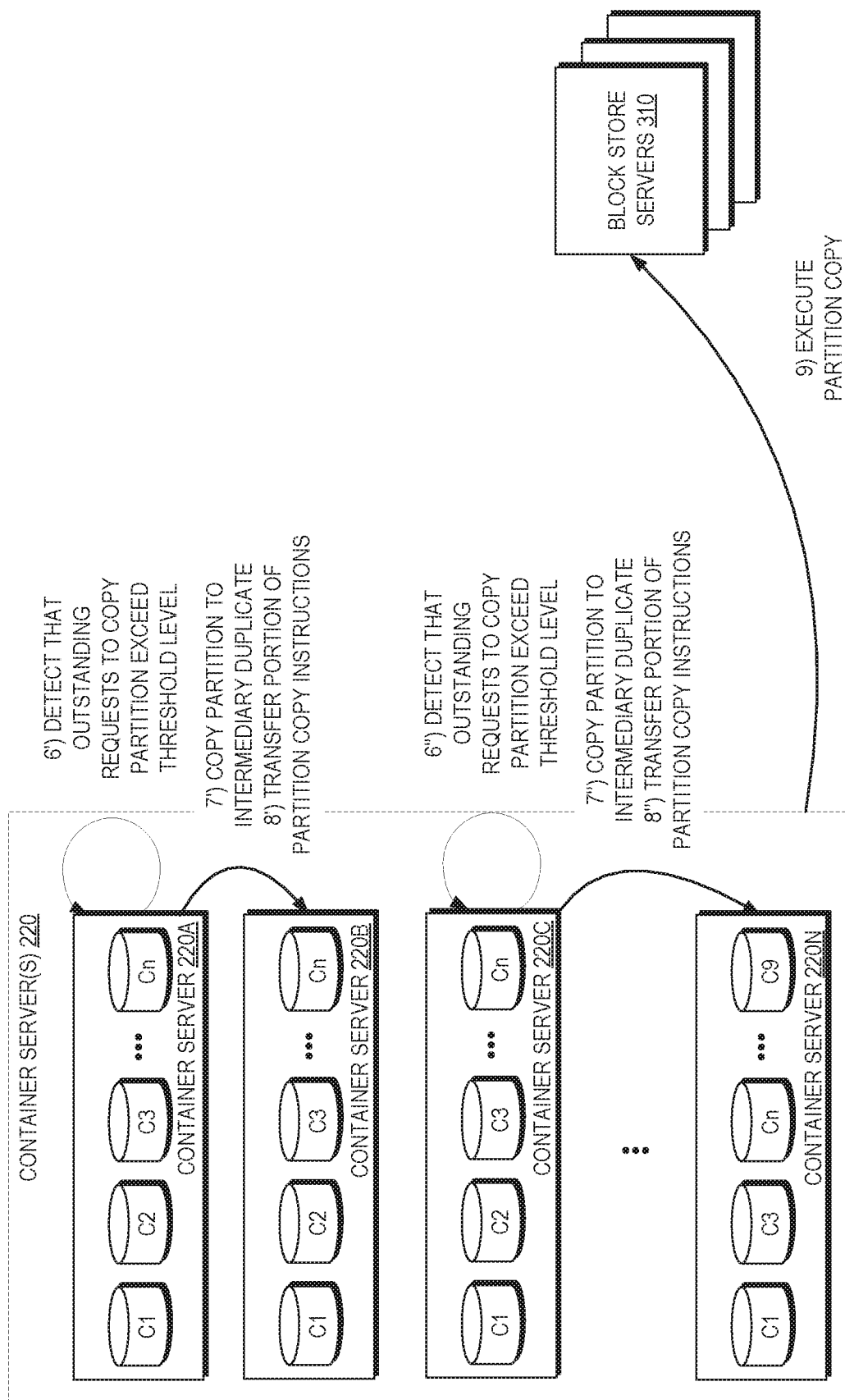
Figure 11C:
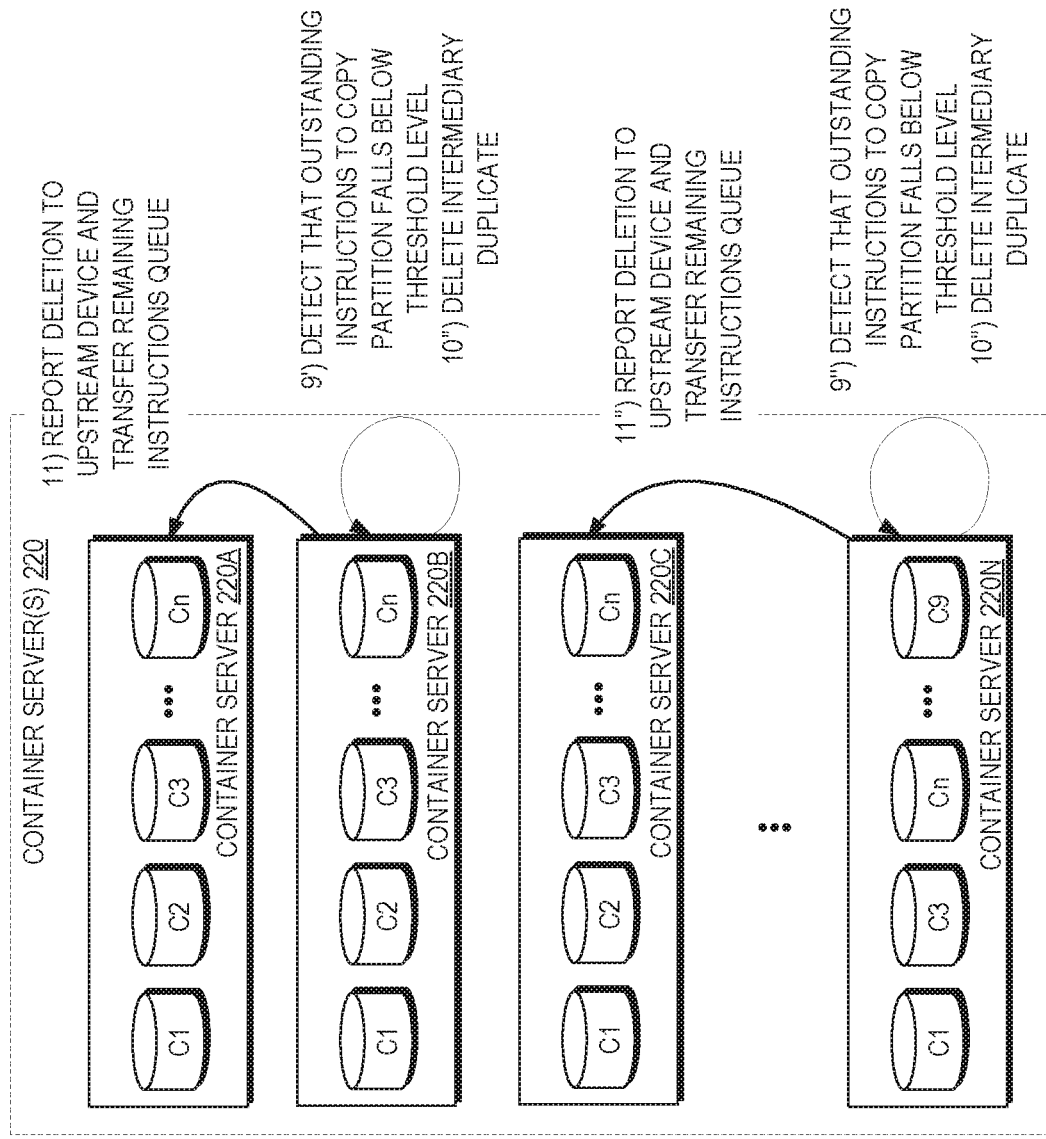

With reference to FIGS. 11A-11C, an additional or alternative set of interactions to those of FIG. 10A-10C will be described. Specifically, while the interactions of FIGS. 10A-10C relate to use of a distributed replica coordinator 205A as a centralized authority to control mass duplication of a partition of a distributed replica, the interactions of FIGS. 11A-11C relate to peer-to-peer operation of container servers 220 to control mass duplication of a partition of a distributed replica. The interactions of FIGS. 11A-11C may be implemented as an alternative to those of FIGS. 10A-10C (e.g., to reduce operational load on the distributed replica coordinator 205A) or in addition to those of FIGS. 10-10C. For example, where excessive computing resources would be required for a coordinator 205A to maintain workload information for each partition of a highly distributed replica, the coordinator 205A may be configured to act as a centralized authority to control mass duplication of only highly-accessed partitions, and the containers 220 may additionally act in a peer-to-peer configuration to control duplication of less-accessed partitions, should the need to duplicate such less-accessed partitions arise. Highly accessed partitions may be identified at the coordinator, for example, by use of a "heavy hitter" algorithm, examples of which are known in the art, or other memory-efficient algorithm to tracks frequent occurrences of values (e.g., requests to copy an individual partition) within a stream of values (e.g., all copy requests).

The interactions of FIG. 11A begin at (1), where the distributed replica coordinator 205A receives a request to copy a partition of a highly distributed replica for a volume to a set of target volumes in a manner similar to interaction (1) of FIG. 10A. However, in contrast to the interactions of FIG. 10A, the distributed replica coordinator 205A in FIG. 11A need not facilitate creation of intermediary duplicates of the initial partition. Rather, at (2), the coordinator 205A may transmit to a container server 220 hosting the initial partition (here, container server 220A) instructions to execute the requested partition copy operations.

At (3), the container server 220A detects that outstanding requests to copy the partition (e.g., as maintained within a queue of requests at the container server 220) exceed a threshold level. In a manner similar to that discussed above, the threshold level can be preestablished as a set value, such as by an administrator of the compute system 110 or by a user of the source volume or a threshold time expected to be required to complete all outstanding request to duplicate a partition. For example, the container server 220A may determine (e.g., based on historical information regarding time to complete requests to duplicate a partition) an expected time required to quiesce its queue of outstanding request to duplicate a partition, and determine that the number of outstanding requests to duplicate the partition exceeds a threshold level when the expected time required to quiesce the queue exceeds a threshold time (e.g., as set by an administrator of the compute system 110 or by a user of the source volume).

In response to the detection of (3), the container server 220A, at (4), copies the initial partition to another container server 220C, thus creating an intermediary duplicate of the partition to the container server 220C. The container server 220A may select the container server 220C according to any number of known load balancing or selection algorithms, such as random selection, round robin selection, or the like. In one embodiment, prior to copying the initial partition to the server 220C, the container server 220A may query the server 220C to request creation of an intermediary duplicate on the server 220C. If the server 220C accepts, the interactions may proceed as described above. If the server 220C rejects, the container server 220A may select and alternative server 220 on which to request creation of an intermediary duplicate. The server 220C may reject, for example, where the server 220C already hosts an intermediary duplicate of the initial partition, where a current workload of the server 220C is too great to enable creation of an intermediary duplicate, etc.

Under the assumption that server 220C accepts, the interactions proceed to (5), where the container server 220A transmits a portion of its present queue of partition copy instructions to the container server 220C. In one embodiment, the server 220A may transfer half of its existing queue of partition copy instructions, thus dividing the partition copy instructions between the servers 220A and 220C.

Thereafter, interactions similar to interactions (3) and (4) may continue to occur within the container servers 220, until each container server 220A maintains partition copy instructions that fall below the threshold level discussed above. For example, interactions are shown in FIG. 11B in which division of outstanding partition copy instructions between two container servers 220 is insufficient to cause the queue of either server 220 to fall below a threshold level of outstanding requests. Accordingly, as shown in FIG. 11B, each container server 220A and 220C can independently determine that its queue of outstanding partition copy requests exceeds a threshold level (e.g., determined as described above), at (6') and (6") (where prime-notation indicates independent interactions that may, but are not required to, occur concurrently). Thereafter, at (7') and (7"), each of the servers 220A and 220C copy the partition to another server (servers 220B and 220N, respectively), thus doubling a number of duplicates of the partition among the servers 220. Interactions similar to these may continue to occur among the container servers 220 until each server 220 maintain a queue of outstanding partition copy instructions that falls below the threshold value. Thereafter, at (8), the servers 220 hosting the initial partition or intermediary duplicate partitions can execute partition copy operations to the block store servers 310, thus copying the partition to the target volumes. While shown as a single operation in interaction (9), each server 220 may execute a partition copy in parallel, thus facilitating rapid transfer of the information of the partition to the block store servers 310. Moreover, each server 220 may be configured to process its own maintained queue of pending partition copy instructions, and as such, may execute partition copies itself in parallel, in serial, or a combination thereof, until the number of outstanding instructions within the server 220's queue falls below a threshold level.

While the interactions of FIGS. 11A and 11B are described with respect to one set of requests to copy a partition, the container servers 220 may be configured to continue to route subsequent requests based on previously created intermediary duplicates. For example, the distributed replica coordinator 205A may continue to transmit instructions to execute partition copies to the container server 220A, as that server 220A is assumed in this instance to host the initial partition to be copied. The server 220A may distributed subsequent partition copy instructions among itself and any servers 220 known to the server 220A to host an intermediary duplicate of the partition. For example, in the interactions of FIGS. 11A and 11B, the server 220 may be aware that intermediary duplicates exist at servers 220B and 220C, and thus may distributed later requests among each of servers 220A, 220B, and 220C according to any of a number of known load balancing techniques (e.g., using round robin distribution). Other servers 220 may similarly forward requests to additional known servers 220 hosting intermediary duplicates, thus enabling subsequent requests to be distributed among intermediary duplicates of a partition.

With reference to FIG. 11C, illustrative interactions are depicted for implementing garbage collection within a peer-to-peer configuration of container servers 220. Specifically, each container 220 may be configured to maintain a queue of outstanding partition copy instructions falling at or below an upper threshold level (e.g., as described above with reference to FIGS. 11A and 11B), and at or above a lower threshold level. The lower threshold level may, in a similar manner to the upper threshold level discussed above, be specified for example with respect to a minimum number of outstanding requests at each server or a minimum time required to complete all outstanding partition copy requests. In some instances, the lower threshold level may be set to zero, such that a container server 220 is configured to delete an intermediary duplicate of a partition only when no outstanding requests to copy the partition exist at the server 220. In some instances, a given server 220 is configured to only delete an intermediary duplicate when no "downstream" servers 220 are known to be maintaining an intermediary duplicate, wherein downstream servers 220 refers to servers 220 on which the given server 220 caused the creation of an intermediary duplicate.

In FIG. 11C, it is assumed that two container servers 220, servers 220B and 220N, detect that outstanding requests at the servers 220 falls below the lower threshold level, at interactions (9') and (9"). As such, at (10') and (10"), the servers 220 delete the intermediary duplicates, thus freeing computing resources of the servers 220. Additionally, at (11') and (11"), the servers 220 report the deletion of their intermediary duplicates to an "upstream" server 220, wherein an upstream server 220 relative to a given server 220 refers to a server 220 which caused the given server 220 to create an intermediary duplicate. Additionally, in interactions (11') and (11"), the servers 220 transfer to the upstream server 220 any remaining partition copy instructions of the servers 220. Thus, the upstream server 220 can be seen as adopting a workload of the servers 220 at which the outstanding copy instructions fall below the lower threshold.

As noted above with respect to FIG. 11C, while embodiments discussed above relate to deletion of an intermediary duplicate based on outstanding partition copy requests, additional or alternative metrics may be used to determine whether to delete an intermediary duplicate. For example, a container server 220 may obtain or determine a historical usage of copy requests for a partition represented by an intermediary duplicate, and from such historical usage, predict future copy requests for the partition (e.g., by projecting historical usage into a future time). Thereafter, the container server 220 may function to delete its intermediary duplicates only when the predicted future copy requests for the partition (e.g., over a future period of time) fall below a threshold level. In one embodiment, the future period of time may be set at least partly based on a time required by the container servers 220 to delete and regenerate the intermediary duplicate partition. Thus, for example, if future partition copy requests are predicted to be sufficient to warrant use of an intermediary duplicate partition in less time than is needed to delete and regenerate the intermediary duplicate partition, the container server 220 may determine that the intermediary duplicate partition should not be deleted.

Figure 12:
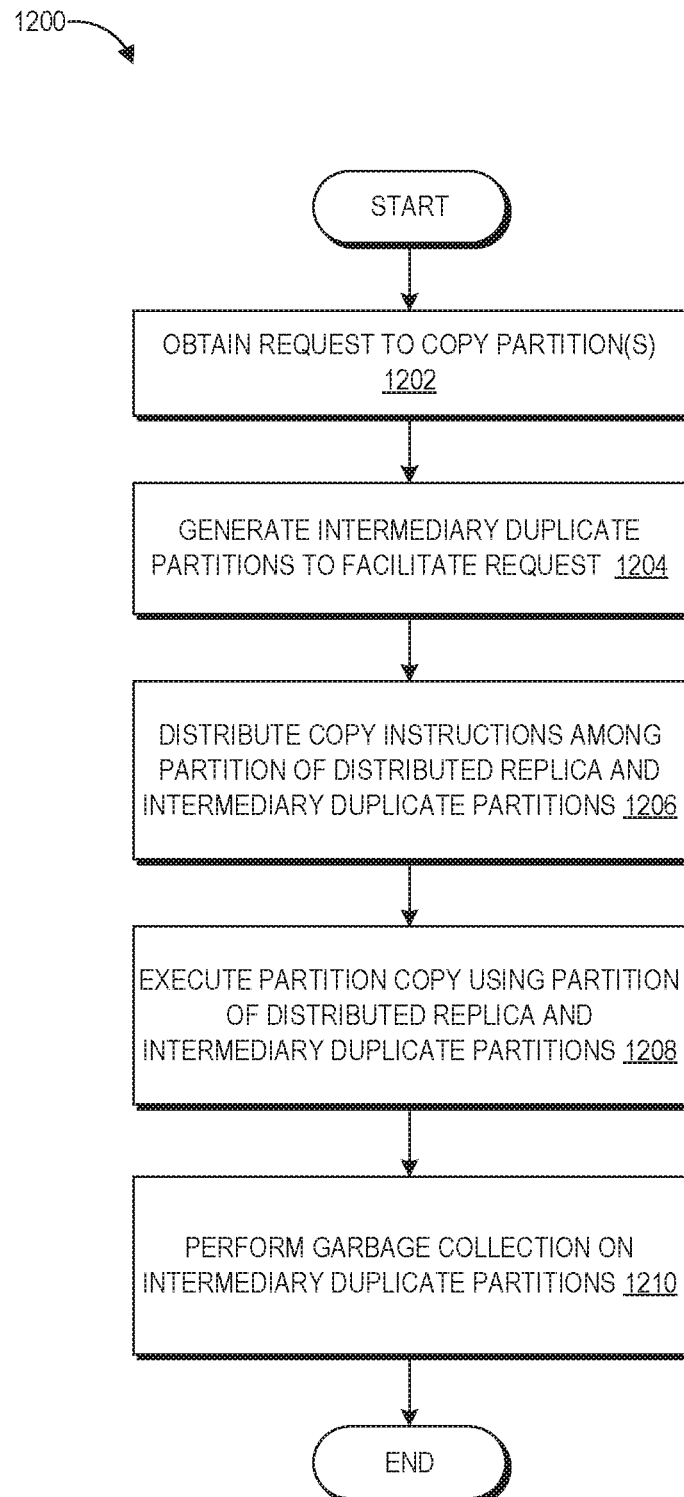
FIG. 12 depicts an illustrative routing for facilitating mass duplication of a volume or portion of a volume by use of intermediary duplicate partitions for the volume.

With reference to FIG. 12, an illustrative routine 1200 is depicted for utilizing one or more intermediary duplicates to facilitate mass duplication of a volume (or portion of a volume) to a set of target volumes. The routine 1220 may be carried out, for example, by a set of container servers 220 hosting a highly distributed replica for the volume, independently or in conjunction with other elements of a compute system 120, such as a distributed replica coordinator 205.

The routine 1200 begins at 1202, wherein requests to copy one or more partitions of a volume to a set of target volumes is received by the container servers 220 or the coordinator 205. As noted above, the request may be submitted, for example, by a user through an API of the compute system 120 and may identify, for example, information stored within the one or more partitions to be copied to a set of target volumes.

At block 1204, the container servers 220 generate, for each of the one or more partitions, one or more intermediary duplicate partitions to utilize in facilitating the requested copy. In one embodiment, intermediary duplicate partitions are created by a centralized authority, such as the replica coordinator 205, in accordance with, for example, the interactions of FIGS. 10A-10C above. In another embodiment, the intermediary duplicate partitions are created via peer-to-peer interactions of the container servers 220, in accordance with, for example, the interactions of FIGS. 11A-11C above.

At block 1206, the requests to copy the one or more partitions are divided among the servers 220 hosting the intermediary duplicates. In one embodiment, a centralized authority, such as the replica coordinator 205, operates to divide the requests among the servers 220 hosting intermediary duplicates in accordance with, for example, the interactions of FIGS. 10A-10C above. In another embodiment, the servers 220 interact in a peer-to-peer manner to divide requests among the servers 220, in accordance with, for example, the interactions of FIGS. 11A-11C above.

At block 1208, partition copy operations are conducted by the servers 220 to copy the information of the one or more partitions (as included, e.g., within initial copies of the partitions or intermediary duplicates of the partitions) to the target volumes. Because the partition copy operations can be implemented at least partially in parallel, and because the number of intermediary duplicates can be high relative to the number of target volumes (potentially in a 1-to-1 ratio with the target volumes), the partition copy operations can be completed quickly relative to using only initial copies of the one or more partitions, without intermediary duplicates.

At block 1210, the servers 220 perform garbage collection to delete excessive intermediary duplicates on the servers 220. The garbage collection may be facilitated, for example, by a centralized authority, in accordance with, for example, the interactions of FIG. 10C above. In another embodiment, the servers 220 interact in a peer-to-peer manner to implement garbage collection, in accordance with, for example, the interactions of FIG. 11C above. The routine 1200 may then end.

While the routine 1200 is described above as illustratively initiated based on a user request, in some embodiments the routine 1200 may be implemented via alternative mechanisms. Illustratively, the routine 1200 may be implemented as a mechanism for providing rapid duplication of a specific partition in response to a user request to read data of that partition from a target volume. For example, consider an instance in which a user requests to copy an initial volume (e.g., as represented by a primary, secondary, and tertiary replica, each of which may be divided into a number of partitions) to a large set of target volumes (e.g., hundreds or thousands of volumes). In one embodiment of the present disclosure, the block store servers 105 may initiate a set of copy operations based on existing partitions (e.g., of the primary, secondary, and tertiary replicas), despite the expectation that such copy operations may require large amounts of time to generate the set of target volumes from the existing partitions. However, the block store servers 105 may further notify the user that the data of the initial volume is available at the set of target volumes, even before the set of copy operations has completed. The block store servers 105 may further function to respond to a read request for a volume of the set of target volumes by initiating a request to copy data from a partition of the initial volume to the read volume. Illustratively, if a sufficient number of read requests is received at volumes of the set of target volumes, the corresponding set of requests to copy data from the partition of the initial volume may initiate the routine 1200. Thus, in some instances, implementation of the routine 1200 may enable the block store servers 105 to populate data on target volumes "on-the-fly," in response to requests from users to read those volumes.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes 230, 320, 410, 505A, 505B, and 901 may begin in response to an event, such as on a predetermined or dynamically determined schedule, on demand when initiated by a user or system administer, or in response to some other event. When the process 230, 320, 410, 505A, 505B, 901, or 1201 is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process 230, 320, 410, 505A, 505B, 901, 1201 or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a set of server computing devices implementing a distributed replica of a data volume, the distributed replica including a set of partitions distributed among at least some of the set of server computing devices, wherein the distributed replica is designated for replication of the data volume and is distinct from an additional replica designated for handling modifications to the data volume; and
   a coordinator computing device configured with computer-executable instructions to:
      receive one or more requests indicating that information within a partition, of the set of partitions, is to be copied to a set of target volumes;
      determine that a number of copy operations required to copy the information within the partition to the set of target volumes satisfies or exceeds a threshold value, wherein the threshold value comprises a threshold number of copy operations or a threshold time for completing the number of copy operations utilizing the partition;
      duplicate the partition within the set of server computing devices to generate intermediary duplicate partitions;
      initiate, in parallel, a set of copy operations copying the information from the intermediary duplicate partitions to the set of target volumes;
      determine that a number of outstanding copy operations required to copy the partition falls at or below the threshold value; and
      delete one or more of the intermediary duplicate partitions.

2. The system of claim 1, wherein the one or more requests indicate that the entirety of the volume is to be copied to the set of target volumes, and wherein duplication of the partition to generate intermediary duplicate partitions further comprises duplication of the set of partitions to generate intermediary duplicate sets of partitions.

3. The system of claim 1, wherein the set of copy operations further comprise a copy operation from the partition to the set of target volumes.

4. The system of claim 1, wherein the set of copy operations correspond to a first set of copy operations copying the information from the intermediary duplicate partitions to a first subset of the set of target volumes, and wherein the controller computing device is further configured with computer-executable instructions to initiate, in parallel, a second set of copy operations copying the information from the intermediary duplicate partitions to a second subset of the set of target volumes.

5. A computer-implemented method comprising:
   implementing a distributed replica of a data volume, the distributed replica including a set of partitions distributed among at least some of a set of server computing devices, wherein the distributed replica is designated for replication of the data volume and is distinct from an additional replica designated for handling modifications to the data volume;
   receiving an indication that information within a partition, of the set of partitions, is to be copied to a set of network devices;
   duplicating the partition within the set of server computing devices to generate intermediary duplicate partitions;
   initiating, in parallel, a set of copy operations copying the information from the intermediary duplicate partitions to the set of network devices;
   determining that a number of outstanding copy operations required to copy the partition to the set of network devices falls at or below a threshold level, wherein the threshold level comprises a threshold number of outstanding copy operations or a threshold time for completing the number of outstanding copy operations utilizing the partition; and
   deleting one or more of the intermediary duplicate partitions.

6. The computer-implemented method of claim 5, wherein the indication is received at a first server computing device, of the set of server computing devices, hosting the partition, and wherein duplicating the partitions within the set of server computing devices comprises selecting, at the first server computing device, a second server computing device of the set of server computing devices on which to generate a first intermediary duplicate partition of the intermediary duplicate partitions.

7. The computer-implemented method of claim 6 further comprising, by the first server computing device, instructing the second server computing device to initiate at least a portion of the set of copy operations.

8. The computer-implemented method of claim 7 further comprising, at the second server computing device:
   selecting a third server computing device of the set of server computing devices on which to generate a second intermediary duplicate partition of the intermediary duplicate partitions; and
   instructing the third server computing device to initiate at least a portion of the set of copy operations.

9. The computer-implemented method of claim 5, wherein the indication is received at a controller computing device, wherein the partition is hosted at a first server computing device of the set of server computing devices, and wherein duplicating the partitions within the set of server computing devices comprises, at the controller computing device:
   selecting a second server computing device of the set of server computing devices to host a first intermediary duplicate partition of the intermediary duplicate partitions; and
   transmitting instructions to the first server computing device to create the first intermediary duplicate partition at least partly duplicating the partition to the second server computing device.

10. The computer-implemented method of claim 9 further comprising, at the controller computing device:
- receiving an indication that the first intermediary duplicate partition has been created;
- selecting a third server computing device of the set of server computing devices to host a second intermediary duplicate partition of the intermediary duplicate partitions; and
- transmitting instructions to the second server computing device to create the second intermediary duplicate partition at least partly duplicating the first intermediary duplicate partition to the third server computing device.

11. Non-transitory computer-readable media comprising instructions executable on a system implementing a distributed replica of a data volume, the distributed replica including a set of partitions distributed among at least some of a set of server computing devices, wherein the distributed replica is designated for replication of the data volume and is distinct from an additional replica designated for handling modifications to the data volume, and wherein the instructions are executable by the system to:
- receive an indication that information within a partition, of the set of partitions, is to be copied to a set of network devices;
- duplicate the partition within the set of server computing devices to generate intermediary duplicate partitions;
- initiate, in parallel, a set of copy operations copying the information from the intermediary duplicate partitions to the set of network devices;
- determine that a number of outstanding copy operations required to copy the partition to the set of network devices falls at or below a threshold level, wherein the threshold level comprises a threshold number of outstanding copy operations or a threshold time for completing the number of outstanding copy operations utilizing the partition; and
- delete the intermediary duplicate partitions.

12. The non-transitory computer-readable media of claim 11, wherein the instructions are further executable by the system to determine that a number of copy operations required to copy the information within the partition to the set of network devices satisfies or exceeds the threshold value.

13. The non-transitory computer-readable media of claim 11, wherein the set of copy operations further comprise a copy operation from the partition to the set of target volumes.

14. The non-transitory computer-readable media of claim 11, wherein the instructions are executable by the system to duplicate the partition within the set of server computing devices at least partly by at least one of causing a centralized device to instruct the set of server computing devices to duplicate the partition or initiating peer-to-peer communications between the set of server computing devices to cause duplicate the partition within the set of server computing devices to generate intermediary duplicate partitions.

15. The non-transitory computer-readable media of claim 11, wherein the instructions are further executable by the system to determine, prior to deletion of the intermediary duplicate partitions, that a future number of requests to copy the partition predicted to occur within a future time period falls at or below a threshold level.

16. The non-transitory computer-readable media of claim 11, wherein the threshold level is determined based at least partly on a number of the intermediary duplicate partitions.

17. The non-transitory computer-readable media of claim 11, wherein the indication that the information within the partition is to be copied to the set of network devices comprises a request to read the information from at least one of the set of network devices.

* * * * *